US009818007B1

(12) United States Patent
Bajovic

(10) Patent No.: US 9,818,007 B1
(45) Date of Patent: Nov. 14, 2017

(54) ELECTRONIC CARE AND CONTENT CLOTHING LABEL

(71) Applicant: Filip Bajovic, New York, NY (US)

(72) Inventor: Filip Bajovic, New York, NY (US)

(73) Assignee: Filip Bajovic, New York, NY (US)

( * ) Notice: Subject to any disclaimer, the term of this patent is extended or adjusted under 35 U.S.C. 154(b) by 0 days.

(21) Appl. No.: 15/484,998

(22) Filed: Apr. 11, 2017

Related U.S. Application Data

(60) Provisional application No. 62/433,111, filed on Dec. 12, 2016.

(51) Int. Cl.
| | | |
|---|---|---|
| *G06F 17/00* | (2006.01) | |
| *G06K 7/10* | (2006.01) | |
| *G06K 7/14* | (2006.01) | |
| *D06F 33/02* | (2006.01) | |

(52) U.S. Cl.
CPC ......... *G06K 7/10386* (2013.01); *D06F 33/02* (2013.01); *G06K 7/10297* (2013.01); *G06K 7/1413* (2013.01); *G06K 7/1417* (2013.01); *D06F 2202/10* (2013.01)

(58) Field of Classification Search
CPC .... G06K 19/00; G06K 7/1413; G06K 7/1417; G06K 7/10297; G06K 7/10386; D06F 33/00; D06F 33/02; D06F 2202/10
See application file for complete search history.

(56) References Cited

U.S. PATENT DOCUMENTS

| | | | | |
|---|---|---|---|---|
| 6,779,731 | B2 * | 8/2004 | Duldhardt | D06F 93/005 134/57 R |
| 7,971,777 | B2 * | 7/2011 | Ha | D06F 58/10 235/375 |
| 9,280,148 | B1 * | 3/2016 | Colett | G06K 19/06037 |
| 9,428,337 | B1 * | 8/2016 | Powell | F16M 13/02 |
| 9,616,466 | B1 * | 4/2017 | Bauer | B07C 5/3412 |
| 2001/0049846 | A1 * | 12/2001 | Guzzi | D06F 33/02 8/158 |
| 2002/0046429 | A1 * | 4/2002 | Jeon | D06F 33/02 8/159 |

(Continued)

OTHER PUBLICATIONS

Restriction Requirement dated Jun. 27, 2017, for U.S. Appl. No. 15/485,002 of Filip Bajovic filed Apr. 11, 2017.

(Continued)

*Primary Examiner* — Claude J Brown
(74) *Attorney, Agent, or Firm* — Perkins Coie LLP

(57) ABSTRACT

The technology disclosed here encodes a clothing item ID as an alphanumeric code within the clothing item, such as within a radio-frequency identification tag. A clothing item cleaning appliance, such as a cell phone, or a washing machine reads the clothing item ID from the clothing item, and retrieves the care and content information from a database maintained on a cloud. For example, the care and content information can include operating settings of the washing machine. The washing machine can adjust its settings and wash the clothing item in accordance with the care and content information of the clothing item. The care and content information stored in the database can be organized in optimized data structures enabling efficient responses to received queries, and efficient updates to the information stored in the data structures.

21 Claims, 21 Drawing Sheets

(56) References Cited

U.S. PATENT DOCUMENTS

| | | | |
|---|---|---|---|
| 2002/0170952 A1* | 11/2002 | Alsafadi | G06F 9/4411 235/375 |
| 2004/0124988 A1* | 7/2004 | Leonard | B05B 11/0054 340/612 |
| 2006/0150689 A1* | 7/2006 | Kim | D06F 29/00 68/236 |
| 2006/0180647 A1* | 8/2006 | Hansen | B60S 3/00 235/375 |
| 2006/0184993 A1* | 8/2006 | Goldthwaite | G06F 3/011 725/135 |
| 2008/0017699 A1* | 1/2008 | Jang | D06F 93/00 235/375 |
| 2008/0078035 A1 | 4/2008 | Haught et al. | |
| 2008/0094228 A1* | 4/2008 | Welch | A61B 5/0002 340/573.1 |
| 2008/0116274 A1* | 5/2008 | Aldridge | D06F 93/00 235/440 |
| 2008/0162603 A1 | 7/2008 | Garg et al. | |
| 2008/0283585 A1* | 11/2008 | Peterman | D06F 33/02 235/375 |
| 2009/0212912 A1* | 8/2009 | Forster | D06F 93/005 340/10.1 |
| 2010/0191770 A1 | 7/2010 | Cho et al. | |
| 2014/0018962 A1 | 1/2014 | Jung et al. | |
| 2014/0236328 A1* | 8/2014 | Kamon | D06F 33/02 700/90 |
| 2015/0186965 A1 | 7/2015 | Paul | |
| 2015/0309993 A1 | 10/2015 | Wilde | |
| 2015/0339726 A1 | 11/2015 | Herring et al. | |
| 2016/0091874 A1* | 3/2016 | Colett | G06K 19/06037 235/385 |
| 2016/0180685 A1* | 6/2016 | Glasgow | D06F 93/00 340/540 |

OTHER PUBLICATIONS

Non-Final Office Action dated Aug. 24, 2017, for U.S. Appl. No. 15/485,002 of Filip Bajovic filed Apr. 11, 2017.

* cited by examiner

| 1300 | | |
|---|---|---|
| 1310 | ID | JIW74* |
| 1320 | Content | |
| | Care | Machine wash cold, nonchlorine bleach, tumble dry low, cool iron, do not dry clean |
| | Place of manufacture | China |
| | Type | Pants |
| | Brand | Levi's |
| 1330 | Unique ID | Yes |
| 1340 | History | Machine wash cold 3 times, machine wash warm 5 times, machine wash warm with wrong colors one time |

1350 →

| 1360 | Material | Cotton, spandex |
|---|---|---|
| 1370 | Percentage | 99%, 1% |
| 1380 | Color | Indigo blue |
| 1390 | Application | Plastic beading |

FIG. 13

ELECTRONIC CARE AND CONTENT CLOTHING LABEL

CROSS-REFERENCE TO RELATED APPLICATIONS

This application claims priority to the U.S. Provisional Patent Application Ser. No. 62/433,111, filed Dec. 12, 2016, which is incorporated herein by reference in its entirety.

TECHNICAL FIELD

The present application is related to a clothing item care and content labels, and more specifically to methods and systems to electronically encode care and content information into a clothing item.

BACKGROUND

Today, clothing item manufacturers and apparel companies use millions of miles of ribbon made from unsustainable materials to create a label for various clothing items such as garments, shoes, hats, purses, etc. The clothing item label must be large enough to contain all care and content information for the garment. In addition, the clothing item label must be understood by users across the globe. Consequently, the clothing item manufacturers and apparel companies create label booklets in various languages, thus further increasing the consumption of the unsustainable materials.

Various manufacturers and apparel companies do not communicate among each other the care and content information even for products that are identical, thus slowing down the process of authoring and/or printing care and content labels. In addition, when the clothing item manufacturers and/or apparel companies make a mistake in authoring and/or printing of the clothing item label, fixing the mistake can involve recalls of hundreds of thousands of clothing items. As a result, the process of creating clothing item labels is inefficient in use of unsustainable materials, prone to error, slow, and cost intensive.

SUMMARY

The technology disclosed here eliminates the need for printing complex care and content information on clothing item labels, and translating the care and content information into various languages. Instead of printing the care and content information on the clothing item labels, the technology disclosed here encodes a clothing item ID as an alphanumeric code within the clothing item, such as within a radio-frequency identification tag. A cell phone, or a washing machine reads the clothing item ID from the clothing item, and retrieves the care and content information from a database maintained on a cloud. For example, the care and content information can include operating settings of the washing machine. The washing machine can adjust its settings and wash the clothing item in accordance with the care and content information of the clothing item. The care and content information stored in the database can be organized in optimized data structures enabling efficient responses to received queries, and efficient updates to the information stored in the data structures.

In addition, the cell phone, or the washing machine can organize a user's wardrobe according to the washing instructions, and/or the drying instructions of the various clothing items in the user's wardrobe, and display that information to the user, thus relieving the user of the need to manually sort items according to the washing, and/or drying instructions. The information presented to the user or can be translated into a language that the user can understand. For example, the information can be translated into a language that the user has specified as the user's preferred language, or the information can be translated into a language associated with a geolocation of the cell phone or the washing machine.

When care and content information for the clothing item needs to be updated, instead of a costly recall involving hundreds of thousands of clothing items, only the cloud database receives the update. When a query is received for care and content information associated with a particular clothing item ID, the database provides the updated care and content information.

As a result, the use of non-sustainable materials in printing clothing item labels can be reduced by at least a 50%. The accuracy of the care and content information is increased because of frequent updates and efficient error correction of the care and content information. The transport of clothing items across borders is faster because the automated checking of the clothing item contents enables faster inspection of the transported clothing items. In addition, visually impaired users can use clothing item cleaning appliances, because the clothing item cleaning appliances can operate automatically based on the retrieved care and content information. Finally, apparel companies can directly communicate with their customers, and can recycle their products to lower the clothing item waste around the globe.

BRIEF DESCRIPTION OF THE DRAWINGS

FIG. 13 shows a data structure storing clothing item information.

DETAILED DESCRIPTION

Technology

The technology disclosed here eliminates the need for printing complex care and content information on clothing item labels, and translating the care and content information into various languages. Instead of printing the care and content information on the clothing item labels, the technology disclosed here encodes a clothing item ID as an alphanumeric code within the clothing item, such as within a radio-frequency identification tag. A cell phone, or a washing machine reads the clothing item ID from the clothing item, and retrieves the care and content information from a database maintained on a cloud. For example, the care and content information can include operating settings of the washing machine. The washing machine can adjust its settings and wash the clothing item in accordance with the care and content information of the clothing item. The care and content information stored in the database can be organized in optimized data structures enabling efficient responses to received queries, and efficient updates to the information stored in the data structures.

In addition, the cell phone, or the washing machine can organize a user's wardrobe according to the washing instructions, and/or the drying instructions of the various clothing items in the user's wardrobe, and display that information to the user, thus relieving the user of the need to manually sort items according to the washing, and/or drying instructions. The information presented to the user or can be translated into a language that the user can understand. For example, the information can be translated into a language that the user has specified as the user's preferred language, or the information can be translated into a language associated with a geolocation of the cell phone or the washing machine.

When care and content information for the clothing item needs to be updated, instead of a costly recall involving hundreds of thousands of clothing items, only the cloud database receives the update. When a query is received for care and content information associated with a particular clothing item ID, the database provides the updated care and content information.

As a result, the use of non-sustainable materials in printing clothing item labels can be reduced by at least a 50%. The accuracy of the care and content information is increased because of frequent updates and efficient error correction of the care and content information. The transport of clothing items across borders is faster because the automated checking of the clothing item contents enables faster inspection of the transported clothing items. In addition, visually impaired users can use clothing item cleaning appliances, because the clothing item cleaning appliances can operate automatically based on the retrieved care and content information. Finally, apparel companies can directly communicate with their customers, and can recycle their products to lower the clothing item waste around the globe.

Figure 1:
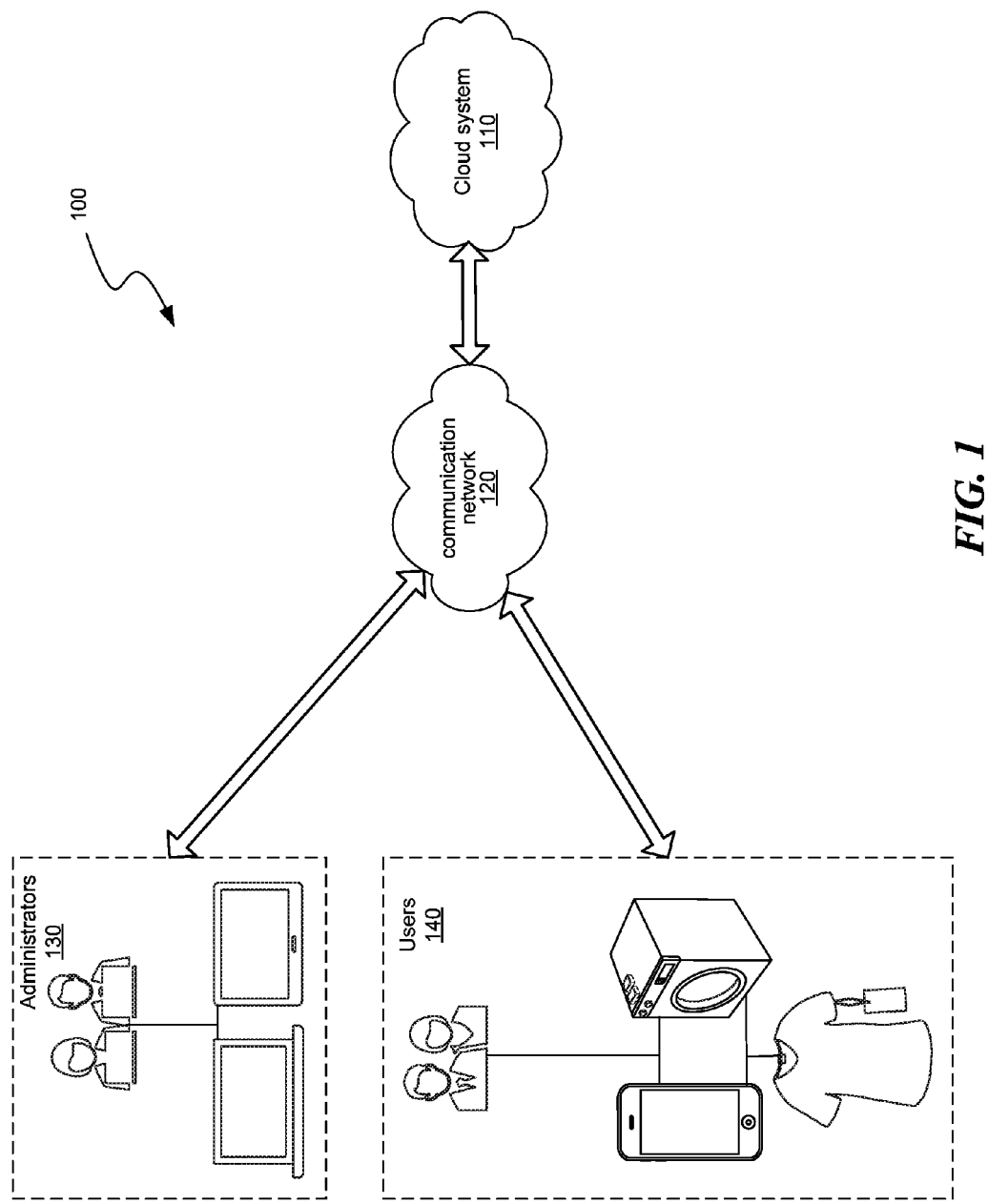
FIG. 1 shows a system for minimizing consumption of textile in production of clothing item labels.

FIG. 1 shows a system for minimizing consumption of textile in production of clothing item labels. The system 100 includes a cloud system 110, a communication network 120, administrators 130, and users 140. Both administrators 130 and users 140 can be users of the system. The cloud system 110 receives through the communication network 120 various information regarding care and content of various clothing items. The cloud system 110 can be located on a server, a desktop computer, laptop computer, a cloud computer, etc. The communication network 120 can be a local area network (LAN), metropolitan area network (MAN), a wide area network (WAN), a public data network (e.g., the Internet), short range wireless network, a cellular network, etc.

Administrators 130 can be clothing item manufacturers, and/or designers. Administrators 130 can input and store care and content information for each clothing item on the cloud system 110, along with an identification (ID) for each clothing item. The care and content information includes information regarding materials contained in the clothing item, percentage of each material contained in the clothing item, and washing, drying, ironing instructions for each material. For example, content information can include percentage of each material contained in the clothing item and can specify "80% percent cotton, 20% polyester." Additionally, the content information can include size of the clothing item, size chart, color of the item, place of manufacturing of the clothing item, brand of the clothing item, etc. For example, the care information (i.e., care instructions) can include the following: "Machine wash cold. Wash with like colors. Do not bleach. Tumble dry low. Warm iron if necessary." The care information can also include best brands of cleaning agents, such as best brand of a detergent, a bleach, a softener, etc., to use for the clothing item.

The clothing item ID can be an alphanumeric string that uniquely identifies a single clothing item. Alternatively, the identification can be an alphanumeric string that uniquely identifies all clothing items made by the same brand and/or apparel company, identical to each other except varying in size. In addition, the identification can be an alphanumeric string that uniquely identifies all clothing items that have the same material content in terms of percentage. The clothing item ID can also be encoded within a logo of the clothing item. For example, small variations in the logo, imperceptible to the human eye, but machine-readable, can encode the clothing item ID.

The administrators 130 can dynamically update the care information for any clothing item, even after the sale of the clothing item. For example, when the administrators 130 discover a method to wash the clothing item such that the longevity of the clothing item is extended, the administrators 130 can update the care and content information on the cloud system 110, even after the clothing item has been sold.

The users 140 can be the buyers of the clothing item or professional cleaners such as dry cleaners. The clothing item ID is stored within the clothing item, and a user device such as a mobile device, or a clothing item cleaning appliance can read the clothing item ID. Upon reading the clothing item ID, the user device can query the cloud system 110 for the care and content information of the clothing item. Once the user device receives the care and content information for the clothing item, the clothing item cleaning appliance can proceed in operating according to the care and content information.

Figure 2:
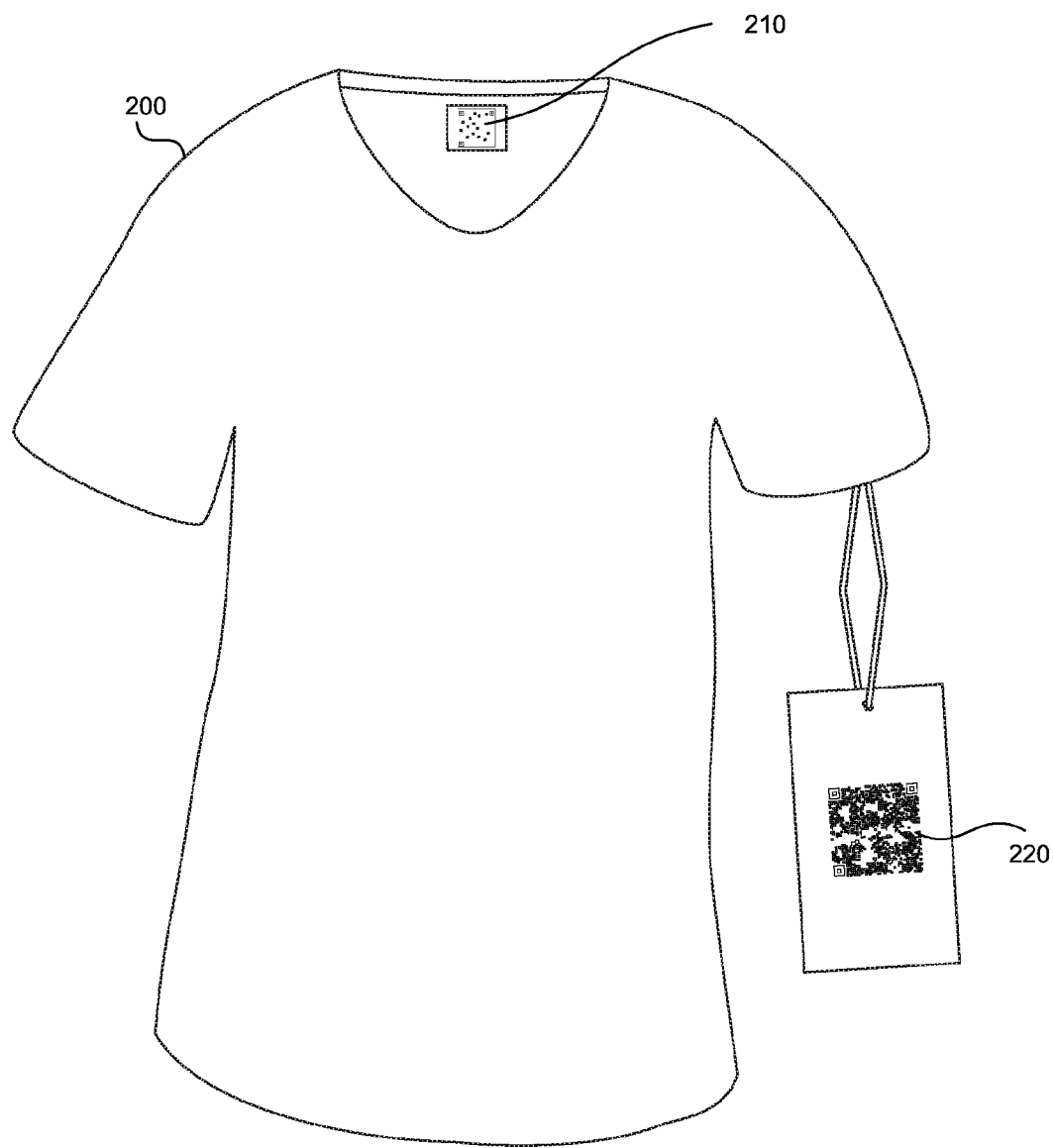
FIG. 2 shows a clothing item with a clothing item ID encoded within the clothing item.

FIG. 2 shows a clothing item with a clothing item ID encoded within the clothing item. The clothing item 200 is a garment, however, the clothing item 200 can be a footwear, a purse, a backpack, a hat, a cap, a hair accessory, a sling, a baby carrier, and/or any item capable of being worn by a person. The clothing item 200 can have the clothing item ID recorded within the clothing item. For example, the clothing item ID can be recorded in a radio-frequency identification (RFID) tag, a near field communication (NFC) tag, a quick response (QR) code, a barcode, a Bluetooth transmitter, a wireless frequency (Wi-Fi) transmitter, or a global positioning system (GPS) transmitter, etc. The clothing item ID so recorded can be affixed on the clothing item label 210, on the clothing item tag 220, or within the fabric of the clothing item 200, etc. In one embodiment, the clothing item ID can be recorded in an e-textile that is a part of the clothing item fabric. E-textiles, also known as smart clothing items, smart clothing, electronic textiles, smart textiles, or smart fabrics, are fabrics that enable digital components (including small computers), and electronics to be embedded in them. The digital component carries the clothing item ID encoded within. The digital component can be an RFID tag, an NFC tag, a Bluetooth transmitter, a Wi-Fi transmitter, a GPS transmitter, etc. The digital component included in the e-textile, affixed to the clothing item label, or affixed to the clothing item itself, can be coated in polyurethane to protect the digital component from moisture and heat when the clothing item is washed, dried, ironed, etc.

Figure 3:
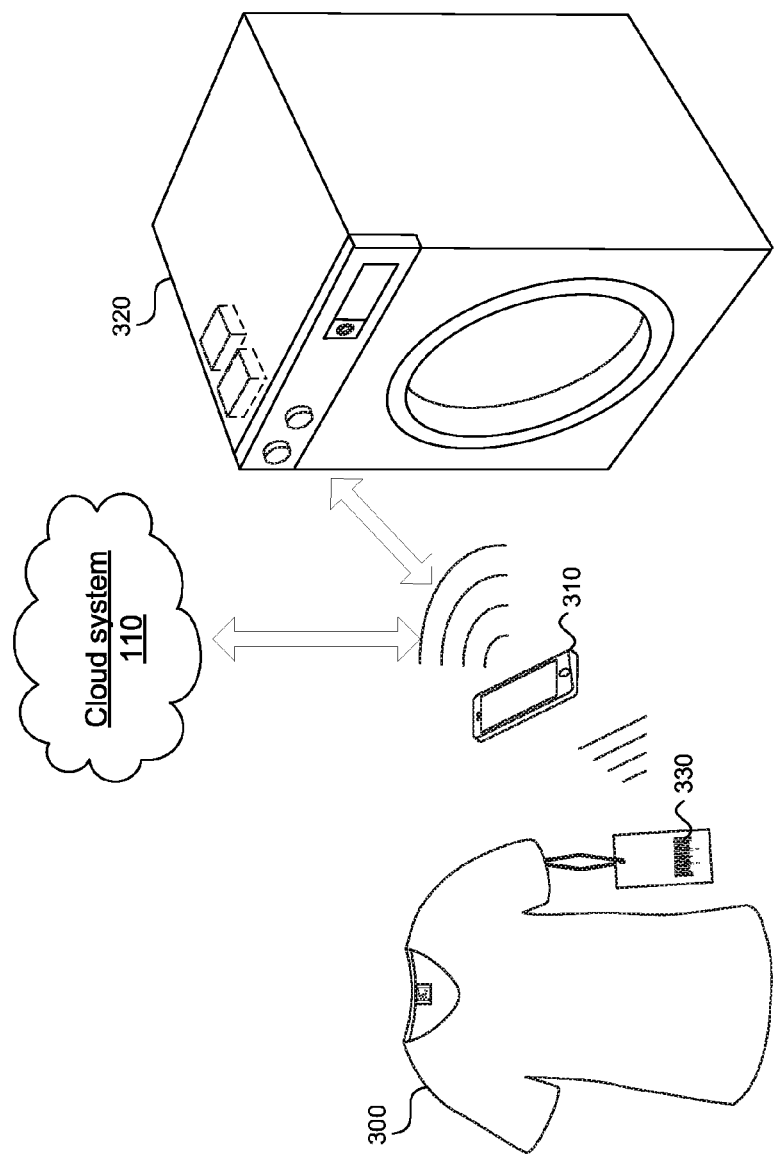
FIG. 3 shows a communication system between the clothing item, one or more devices, and the cloud system, according to one embodiment.

FIG. 3 shows a communication system between the clothing item, one or more devices, and the cloud system, according to one embodiment. The communication system includes a clothing item ID 330 encoded within the clothing item 300, one or more devices 310, 320, and the cloud system 110. In this example, one or more devices 310, 320 include a user device 310, and a clothing item cleaning appliance 320. The clothing item cleaning appliance 320 can be a washing machine, a drying machine, a dry cleaning appliance such as Swash, an ironing appliance, a steaming appliance, etc. The user device 310 can be a cell phone, a tablet, or a device configured to read the clothing item ID, such as an RFID reader, NFC reader, barcode reader, etc.

The user device 310 reads the clothing item ID 330 from the clothing item 300, and queries the cloud system 110 for care and content information associated with the clothing item ID 330. Upon receiving the care and content information from the cloud system 110, the user device 310 communicates the care and content information to the clothing item cleaning appliance 320. The clothing item cleaning appliance 320 sets its operation parameters to match the care and content information received from the user device 310. When there are multiple items with conflicting care and content information placed in the clothing item cleaning appliance 320, the clothing item cleaning appliance 320, or the user device 310 can display an error, as described with respect to FIG. 6.

For example, the care and content information can specify "machine wash cold. Wash with like colors. Do not bleach." When the clothing item cleaning appliance 320 is a washing machine, the washing machine 320 sets the wash cycle to cold. In another example, the care and content information can specify "tumble dry low." When the clothing item cleaning appliance 320 is a dryer, the dryer 320 sets the dry cycle to "tumble dry low."

The user device 310 can also display the care and content information received from the cloud system 110 to a user of the user device 310. Based on the geolocation of the user device 310, or based on user preferences stored in the user device 310, the care and content information can be translated into a language that the user understands.

In one embodiment, the cloud system 110 receives the geolocation of the user device 310, and based on the geolocation of the user device 310, the cloud system 110 translates the care and content information into the language associated with the geolocation of the user device 310. In another embodiment, the cloud system 110 receives the user preferences stored in the user device 310, such as the user's language preference. Based on the user's language preference, the cloud system 110 translates the care and content information into the appropriate language. Similarly, the translation can be performed on the user device 310, instead of the cloud system 110. When the user's language preference is specified, the user's language preference overrides the geolocation of the user device 310. For example, if the user device 310 is located in United States, however the user preferences specify "Spanish" as the user's language preference, the user device 310 displays the care and content information in Spanish.

Figure 4:
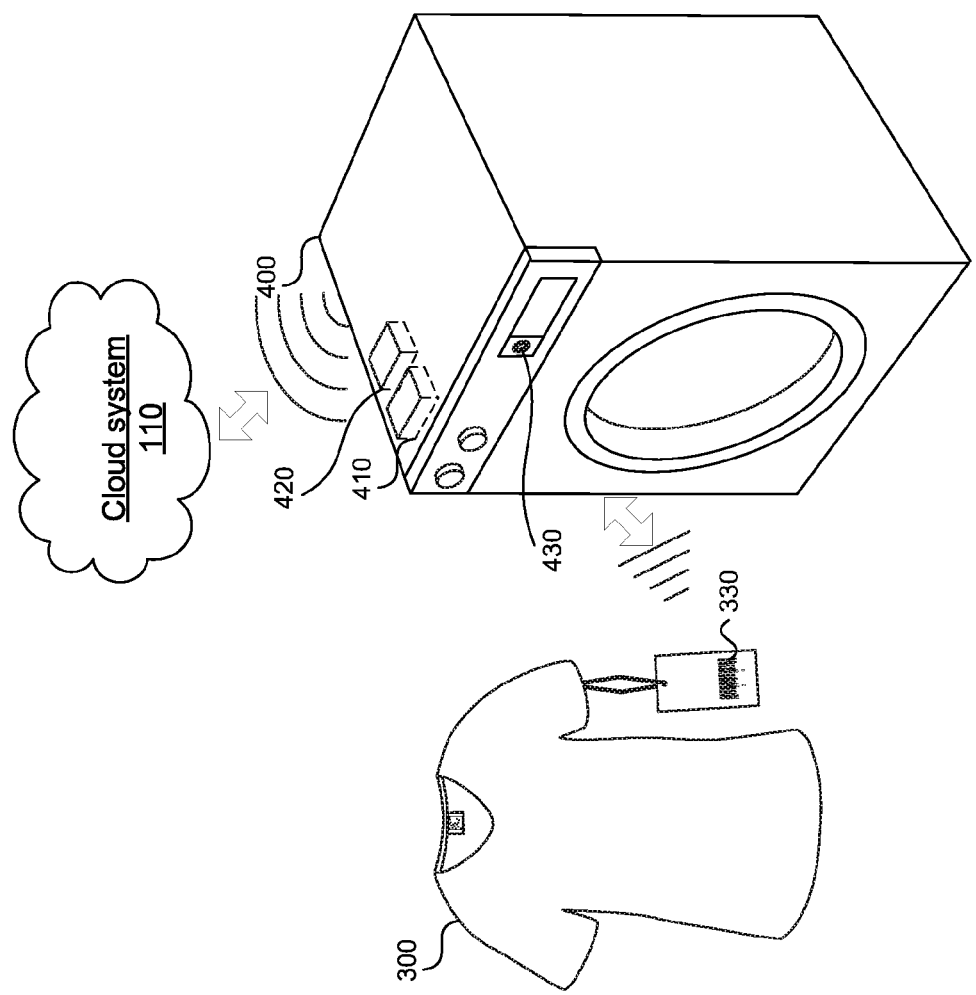
FIG. 4 shows a communication system between the clothing item, one or more devices, and the cloud system, according to another embodiment.

FIG. 4 shows a communication system between the clothing item, one or more devices, and the cloud system, according to another embodiment. The communication system includes a clothing item ID 330 encoded within the clothing item 300, one or more devices 400, 320, and the cloud system 110. The communication system in FIG. 4 is similar to the communication system in FIG. 3. However, unlike in FIG. 3, in this example, the device communicating with the cloud system 110 is the clothing item cleaning appliance 400. The clothing item cleaning appliance 400 can be a washing machine, a drying machine, a dry cleaning appliance such as Swash, an ironing appliance, a steaming appliance, etc.

The clothing item cleaning appliance 400, in addition to performing clothing item cleaning appliance functions as described in FIG. 3, performs all the functions of the user device 310, as described in FIG. 3. For example, the clothing item cleaning appliance 400 can communicate its geolocation to the cloud system 110, can store user specified language preference and communicate the user-specified language preference to the cloud system 110. The clothing item cleaning appliance 400 can contain a display to show care and content information received from the cloud system 110 to the user.

The clothing item cleaning appliance 400 can include one or more readers 410, 420, 430 to obtain the clothing item ID 330 encoded within the clothing item 300. One or more readers 410, 420, 430 can be an RFID tag reader, an NFC tag reader, a camera, a Bluetooth transceiver, a GPS transceiver, and/or a Wi-Fi transceiver, etc. The one or more readers 410, 420, 430 can be placed outside the clothing item cleaning appliance 400, or can be placed inside the clothing item cleaning appliance 400.

Figure 5:
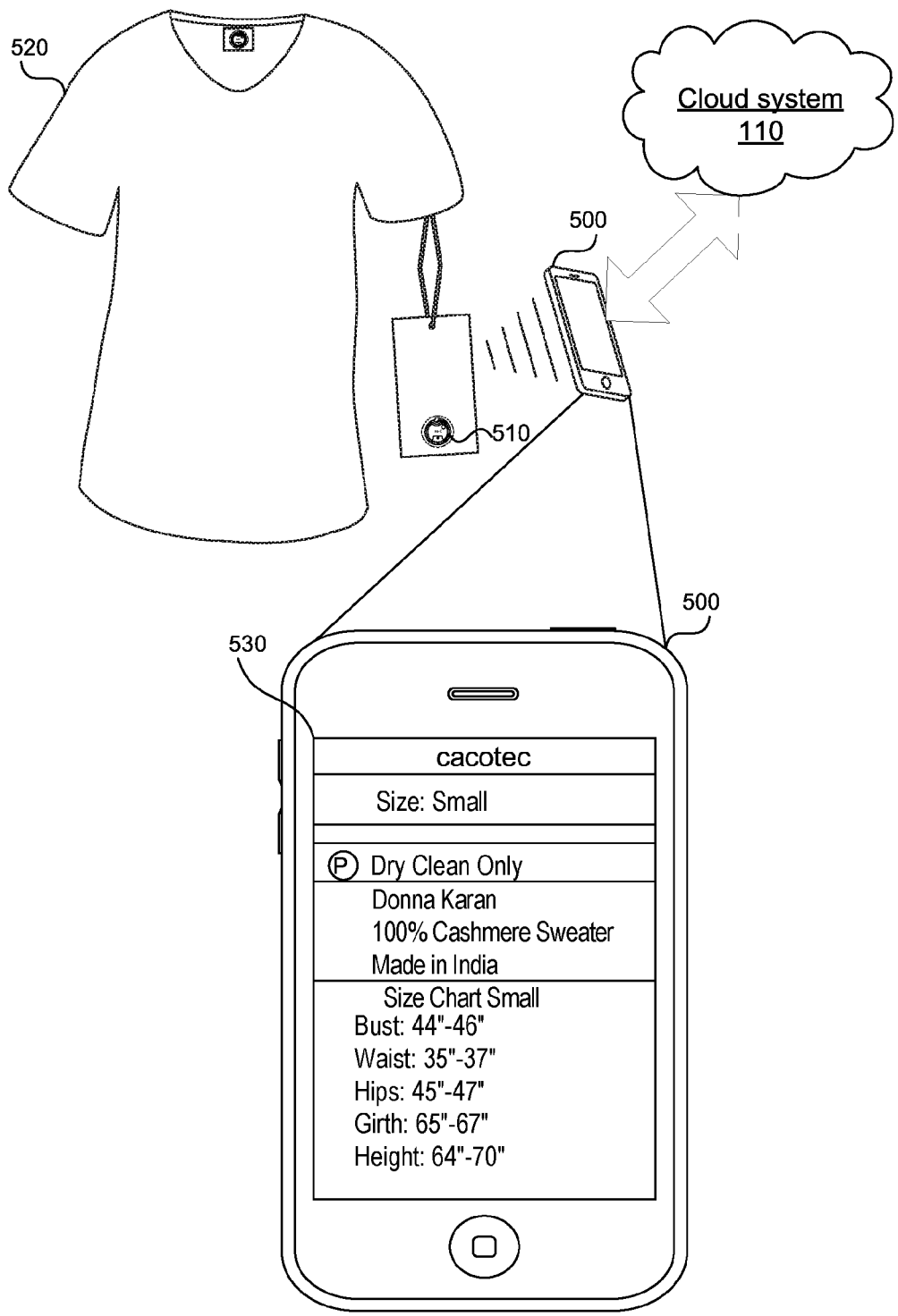
FIG. 5 shows an example of care and content information displayed on a device of a user.

FIG. 5 shows an example of care and content information displayed on a device of a user. The device 500 can be a user device, such as a cell phone, a tablet, etc. The device 500 can read the clothing item ID 510, and retrieve care and content information from the cloud system 110. The care and content information can be shown to the user on the display 530 of the device 500. The care and content information can include size of the item, washing instructions, designer of the item, materials used in the item, geolocation of manufacturing the item, size chart used in determining the size of the item, color of the item, etc. Such information can be useful to a consumer considering whether to buy the clothing item 520. The information displayed on the device 500 can be translated into the language that the consumer can understand. The translation can be based on the language associated with the geolocation of the device 500, or the translation can be based on the user's language preference stored in the device 500, as described in this application.

Figure 6:
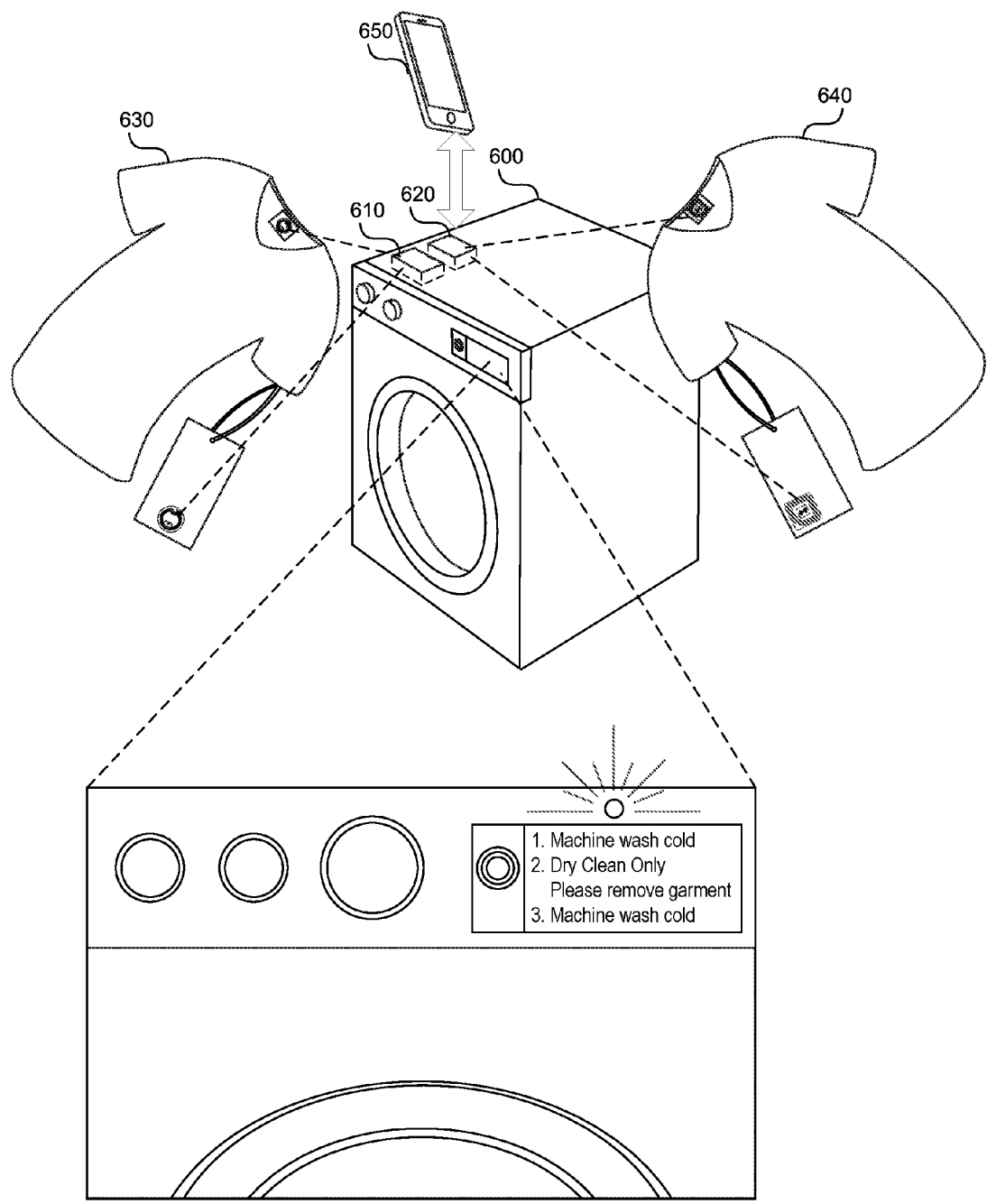
FIG. 6 shows a clothing item cleaning appliance reporting an error.

FIG. 6 shows a clothing item cleaning appliance reporting an error. The clothing item cleaning appliance 600 can be a washing machine, drying machine, a dry cleaning appliance such as a Swash appliance, an ironing appliance, a steaming appliance, etc. The clothing item cleaning appliance can include one or more clothing item ID readers 610, 620 which can read clothing item clothing item IDs placed within the clothing item cleaning appliance 600. The clothing item ID readers 610, 620 can be an RFID tag reader, an NFC tag reader, a camera, a Bluetooth transceiver, a GPS transceiver, and/or a Wi-Fi transceiver, etc., and can be placed inside or outside of the clothing item cleaning appliance 600. Once the clothing items 630, 640 have been placed inside the clothing item cleaning appliance 600, the clothing item cleaning appliance 600 can obtain the care information from a cloud system. The clothing item cleaning appliance 600 can obtain the care information by directly communicating with the cloud system as described in FIG. 4, or by communicating with a user device 650 which in turn communicates with the cloud system as described in FIG. 3.

The clothing item cleaning appliance 600, or the user device 650, can receive care and content information from the cloud system for each of the clothing items placed inside the clothing item cleaning appliance 600. The clothing item cleaning appliance 600, or the user device 650 can compare the received care and content information to determine if the received care and content information for each of the clothing items 630, 640 inside the clothing item cleaning appliance 600 is the same. When the received care content information for each of the clothing item 630, 640 is not the same, the clothing item cleaning appliance 600 or the user device 650 can report an error to a user. The error can be displayed on a display of the clothing item cleaning appliance 600, or the display of the user device 650. In one embodiment, the user can override the error, and manually specify settings according to which the clothing item cleaning appliance 600 should operate. In another embodiment, the user can override the error, and let the clothing item cleaning appliance 600 select the operating settings. For example, the clothing item cleaning appliance 600 can choose the gentlest operating setting, out of all received operating settings.

For example, when the care and content information for garment 630 specifies "machine wash cold", while the care and content information for garment 640 specifies "dry clean only," the clothing item cleaning appliance 600 or the user device 650 can display an error such as "dry clean only: please remove the Donna Karan Cashmere sweater." Clothing item cleaning appliance 600 or the user device 650 receives the care and content information that garment 640 is a Cashmere sweater, that the garment 640 is dry-clean only, and that the garment 640 is made by Donna Karan. If the user overrides the reported error, the clothing item cleaning appliance 600 or the user device 650 can choose the gentlest operating settings. In the present case, if "dry clean" setting is not available, and the gentlest operating setting is "hand wash," the clothing item cleaning appliance 600 proceeds to operate under "hand wash" settings. In another example, the care and content information for garment 630 can specify "machine wash hot," while the care and content information for garment 640 can specify "machine wash warm." In that case, the clothing item cleaning appliance or the user device 650 can choose the gentlest operating settings, which in this case are "machine wash warm."

In another example, when the care and content information for garment 630 specifies "machine wash cold. Wash with like colors. Color red", while the care and contact information for garment 640 specifies "Machine wash cold. Color green", the clothing item cleaning appliance 600 or the user device 650 can display an error such as "different colors: please remove all non-red items." If the user overrides the reported error, the clothing item cleaning appliance 600 or the user device 650 can choose the gentlest operating setting, such as "hand wash", to avoid color bleeding.

Similarly, when the clothing item cleaning appliance 600 is a dryer, or an ironing appliance, the clothing item cleaning appliance 600 can report an error when the settings of the clothing item cleaning appliance 600 do not match the care and content information received from the cloud system.

Figure 7:
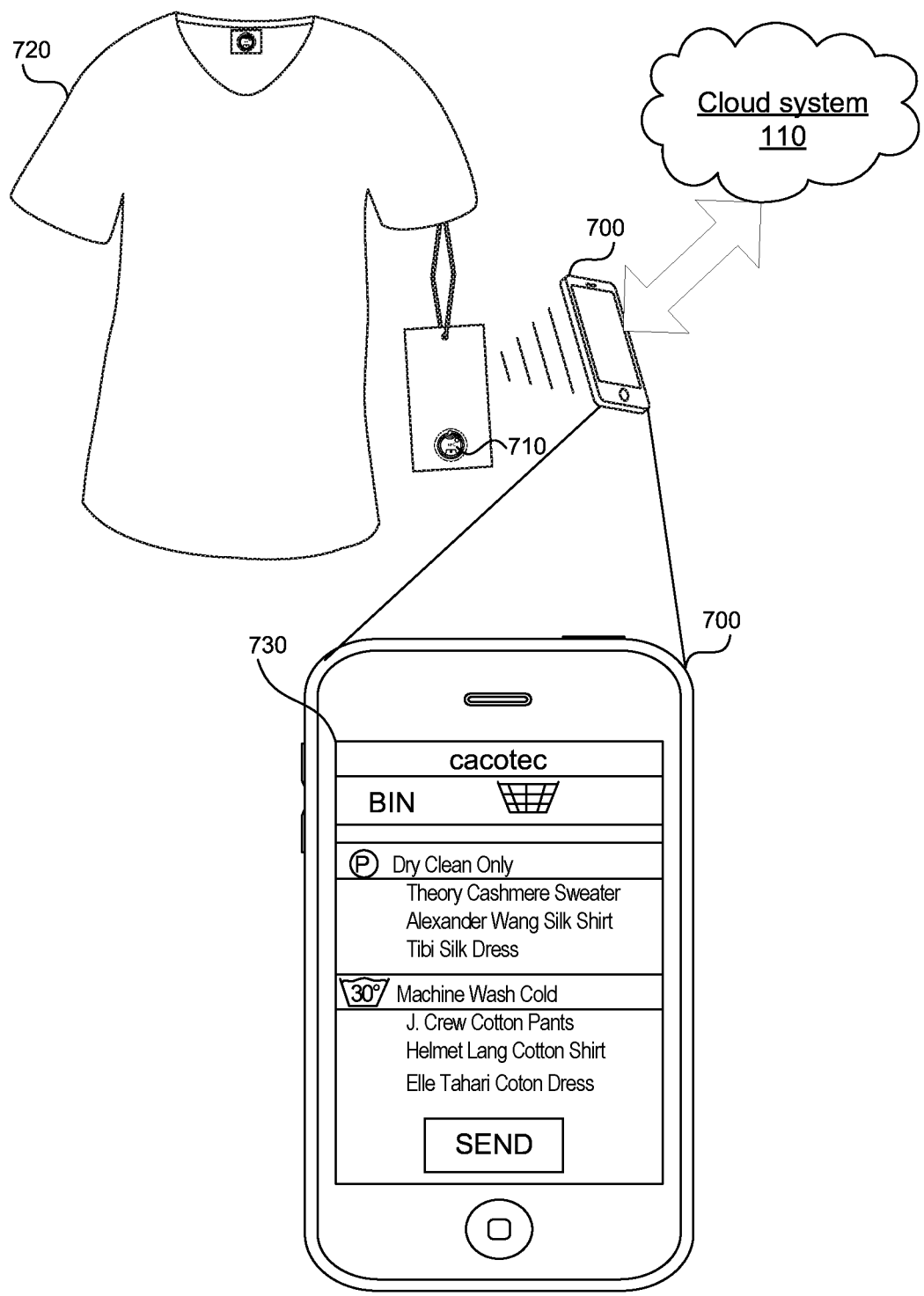
FIG. 7 is an example of organizing care and content information into bins.

FIG. 7 is an example of organizing care and content information into bins. The user device 700 obtains clothing item ID 710, from the clothing item 720. In one embodiment, the user device 700 sends the clothing item ID 710, a user identification (user ID), geolocation of the user device 700, and/or the user's language preference to a cloud system 110. The cloud system 110 can associate the clothing item ID 710 with the user ID, and can create a digital wardrobe associated with the user ID. The digital wardrobe can be organized into bins according to care and content instructions. For example, a bin contains all of the clothing item IDs that have the same care information for a particular clothing item cleaning appliance. In a more specific example, the bin contains all the clothing item IDs that have the same wash instructions; or the bin can contain all the clothing item IDs that have the same dry instructions; or the bin can contain all the clothing item IDs that have the same ironing instructions. In FIG. 7, display 730 of the user device 700 shows bins that contain all the clothing item IDs that have the same wash instructions. Based on the geolocation of the user device 700, and/or the user's language preference, the user device 700 shows bins in a language that the user can understand. In another embodiment, a clothing item cleaning appliance organizes the clothing item IDs into bins, and displays them to the user in the language of the user can understand.

Figure 8:
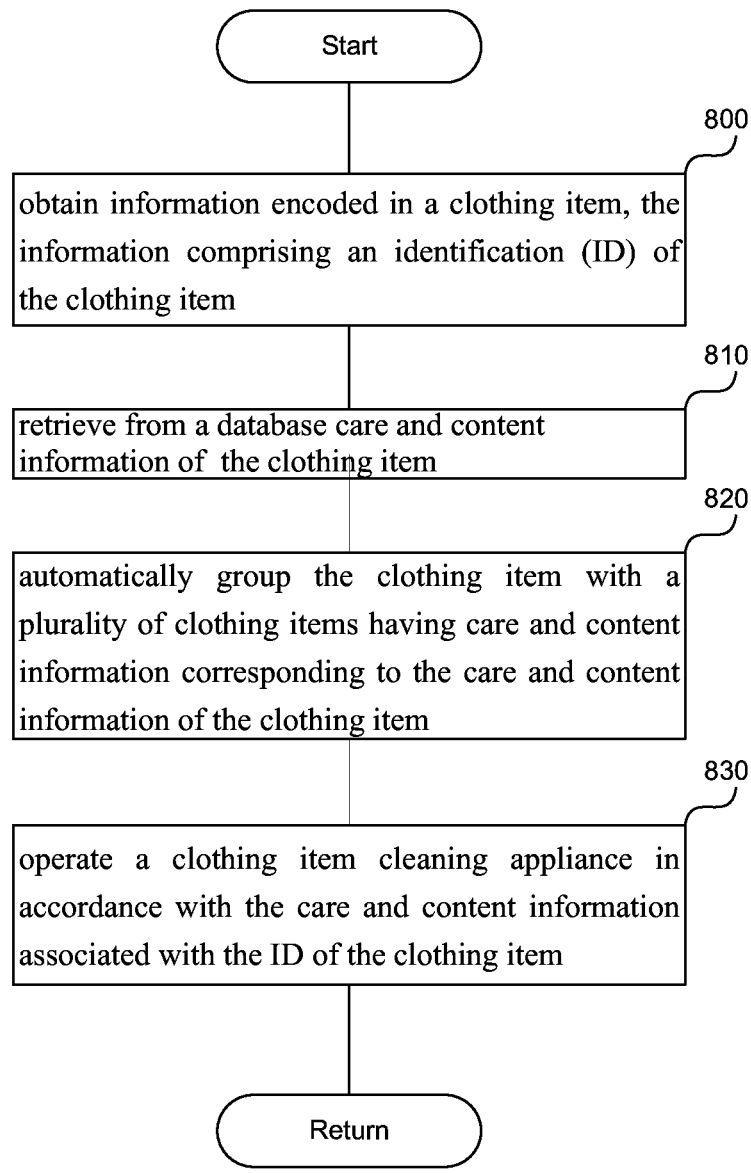
FIG. 8 is a flowchart of a method to operate a clothing item cleaning appliance in accordance with care and content information of a clothing item.

FIG. 8 is a flowchart of a method to operate a clothing item cleaning appliance in accordance with care and content information of a clothing item. In step 800, a processor obtains information encoded in a clothing item. The information includes an identification (ID) of the clothing item. The information can be encoded in the clothing item in various ways, such as a radio-frequency identification (RFID) tag, a near field communication (NFC) tag, a quick response (QR) code, a barcode, a Bluetooth transmitter, a Wi-Fi transmitter, a GPS transmitter, etc. The information can be encoded in an e-textile, or smart clothing, as a digital component embedded in a fabric of the clothing item. The information can be affixed to the care content label, can be printed onto the clothing item, or woven into the clothing item as a fabric, a thread, a button, a bead, etc., containing the digital component.

In step 810, the processor retrieves from a database care and content information of the clothing item. The care and content information is associated with the clothing item ID in the database. The care and content information can be washing instructions, drying instructions, ironing instructions, etc. The care and content information can include recommendations regarding which cleaning agents to use, such as which detergent, bleach, or fabrics softeners are best.

In step 820, the processor automatically groups the clothing item with multiple clothing items having care and content information corresponding to the care and content information of the clothing item, e.g., having the same care and content information. For example, in automatically grouping the multiple clothing items, the processor can detect that multiple clothing items placed inside the clothing item cleaning appliance have disparate care and content information. Upon detecting disparate care and content information, the processor can send a notification, which includes an indication that multiple clothing items placed inside the clothing item cleaning appliance have disparate care and content information. The notification can be an error code, or text, displayed on the user device, or on the clothing item cleaning appliance. The text can be translated into a user preferred language, as described in this application. The processor can allow the user to override the error, and force the operation of the clothing item cleaning appliance. The operating settings of the clothing item cleaning appliance can be set by the user, or the clothing item cleaning appliance can select gentlest settings out of the disparate care and content information.

In another example, in automatically grouping the clothing items, the processor can check whether the capacity of the clothing item cleaning appliance has been exceeded once all the clothing items have been placed into the clothing item cleaning appliance. The processor can send a notification which includes an indication that the capacity of the clothing item cleaning appliance has been exceeded. The notification can be an error code, or text, displayed on the user device, or on the clothing item cleaning appliance. The text can be translated into a user preferred language, as described in this application. The notification can also include a suggestion of how many clothing items to remove, or which specific clothing items to remove. In a more specific example, the notification can say "please remove the Donna Karan sweater, and the Abercrombie and Fitch blouse," or the notification can say "please remove two clothing items from the clothing item cleaning appliance."

In a third example, in automatically grouping the clothing items, the processor can organize multiple clothing items belonging to the user into multiple bins. Each bin among multiple bins includes clothing items that have the same care and content information. The processor can display the information contained in multiple bins to the user, in the user's language preference, as described in this application.

In step 830, the processor operates a clothing item cleaning appliance in accordance with the care and content information retrieved in step 810. The clothing item cleaning appliance can be a washing machine, a drying machine, a dry cleaning machine such as Swash, an ironing appliance, a steaming appliance, etc. In determining the operating settings of the clothing item cleaning appliance, the processor can adjust the operating settings to be the optimal settings for the clothing items inside the clothing item cleaning appliance. The optimal settings may not be available to a user operating the clothing item cleaning appliance manually. For example, the processor detects that the clothing items placed within a washer are 100% cotton. The processor retrieves from the database that the optimal settings for a washing machine washing cotton are 108° C., and cycle length 30 minutes. Even though settings of 108° C. and cycle length 30 minutes are not available as a button on the washing machine, the washing machine can proceed in washing the clothing items according to the optimal settings for 100% cotton.

Upon completing the operation of the clothing item cleaning appliance, the processor can send to the database settings of the clothing item cleaning appliance during the operation, and the clothing item ID subjected to the operation of the clothing item cleaning appliance. Once the database receives the operating settings of the clothing item cleaning appliance, the database can track how many times the clothing item ID has been cleaned, and at what settings.

The processor can be part of the clothing item cleaning appliance, or the processor can be part of a device separate from the clothing item cleaning appliance such as a user device. The user device can be a cell phone, a tablet, a home system, etc. When the processor is part of the device separate from the clothing cleaning item appliance, the processor sends the retrieved care and content information to the clothing item cleaning appliance.

Figure 9:
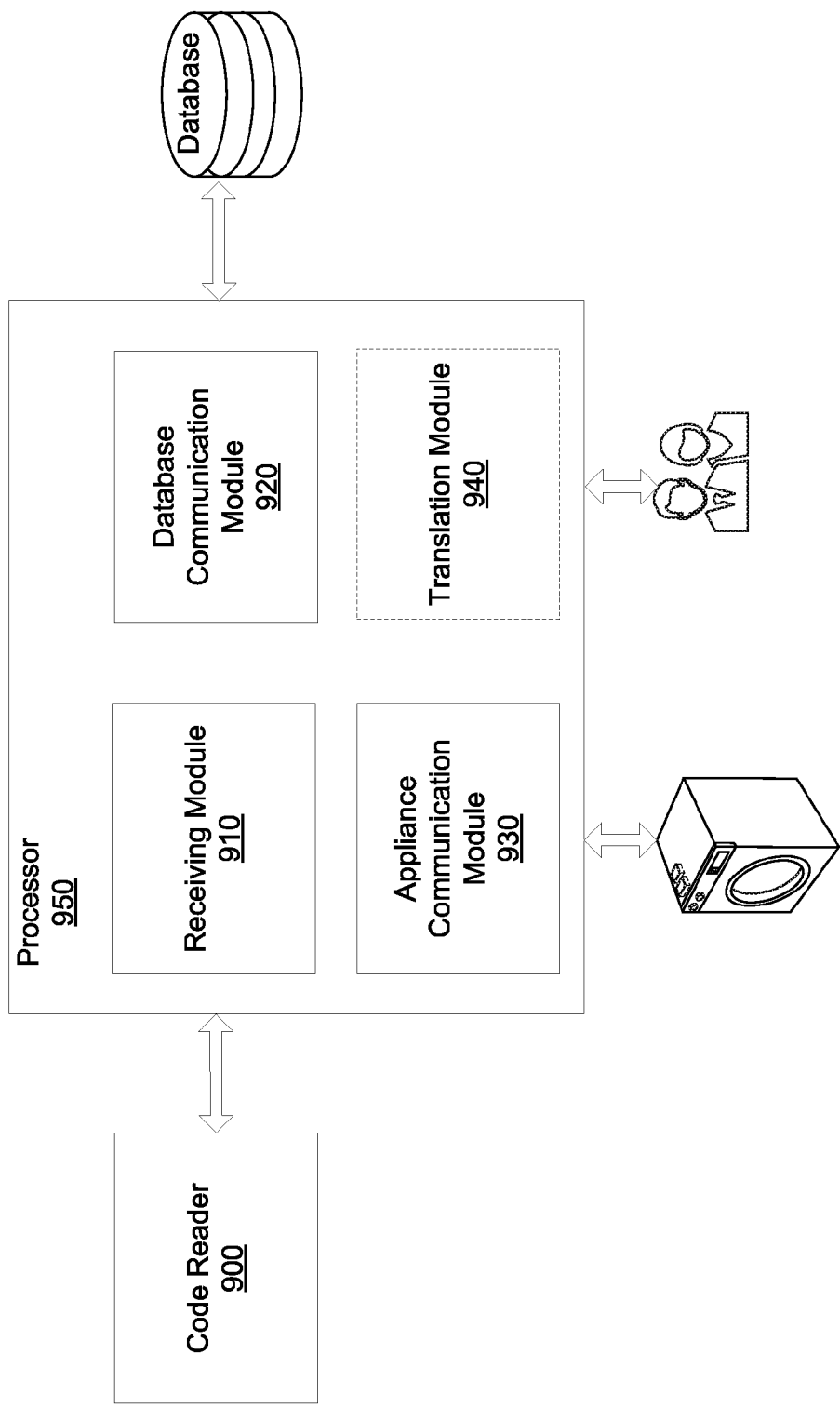
FIG. 9 is a system to operate a clothing item cleaning appliance according to a care and content information of the clothing item.

FIG. 9 is a system to operate a clothing item cleaning appliance according to a care and content information of the clothing item. The system includes a code reader 900, a receiving module 910, a database communication module 920, an appliance communication module 930, and an optional translation module 940. The code reader 900 obtains information encoded in a clothing item including an identification (ID) of the clothing item. The code reader 900 can beam an RFID tag reader, an NFC tag reader, a camera, a Bluetooth receiver, Wi-Fi receiver, or a GPS receiver. The clothing item ID can be printed on the clothing item label, on the clothing item itself, or woven within the fabric of the clothing item.

The receiving module 910 receives the ID from the code reader and passes it to the database communication module 920. Database communication module 920 retrieves from a database care and content information for the clothing item, by sending the clothing item ID to the database, and in return receiving the care and content information associated with the ID in the database. The care and content information can be washing instructions, drying instructions, ironing instructions, color of the clothing item, materials contained in the clothing item, etc., as described in this application.

Appliance communication module 930 automatically groups the clothing item with multiple clothing items having care and content information corresponding to the care and content information of the clothing item and operates a clothing item cleaning appliance in accordance with the care and content information for the clothing item. The clothing item cleaning appliance can be a washing machine, a drying machine, a dry-cleaning machine, an ironing appliance, a steaming appliance, etc. The appliance communication module 930 can send instructions to the clothing item cleaning appliance and can receive information from the clothing item cleaning appliance. The instructions can contain operating settings of the clothing item cleaning appliance, and/or a time to start the operation. The information received from the clothing item cleaning appliance can include the IDs of the clothing items inside the clothing item cleaning appliance, and/or an operating settings of the completed cycle.

The appliance communication module 930 can detect that multiple clothing items placed inside the clothing item cleaning appliance have disparate care and content information. Upon detecting disparate care and content information, the appliance communication module 930 can send a notification, to a user, that multiple clothing items placed inside the clothing item cleaning appliance have disparate care and content information. The notification can be an error code displayed on the user device, or on the clothing item cleaning appliance. The appliance communication module 930 can allow the user to override the error, and specify operating settings for the clothing item cleaning appliance. Further, upon detecting disparate care and content information, the appliance communication module 930 can determine a gentlest operating settings from the care and content information of multiple clothing items, and operate the clothing item cleaning appliance according to the gentlest operating settings. For example, if care and content information of one clothing item specify "machine wash cold", while the rest of the care and content information specify "machine wash hot," the appliance communication module 930 can determine to operate the clothing item cleaning appliance according to the "machine wash cold" operating settings.

The translation module 940 can determine a user preferred language based on geolocation of the processor, or the user's language preference. The translation module 940 can translate information presented to the user into the user preferred language. When the translation module 940 receives both the user's language preference and the geolocation of the processor, the translation module 940 translates received text according to the user's language preference.

The receiving module 910, the database communication module 920, the appliance communication module 930, and the translation module 940 can be implemented on a processor 950 mounted within the clothing item cleaning appliance. The receiving module 910, the database communication module 920, the appliance communication module 930, and the translation module 940 can be implemented on a processor 950 mounted within a device separate from the clothing item cleaning appliance, such as a cell phone, a tablet, a personal digital assistant, a home system, etc. The processor 950 can be a microcontroller, a microprocessor, a programmable logic device, special purpose hardware, etc.

Figure 10:
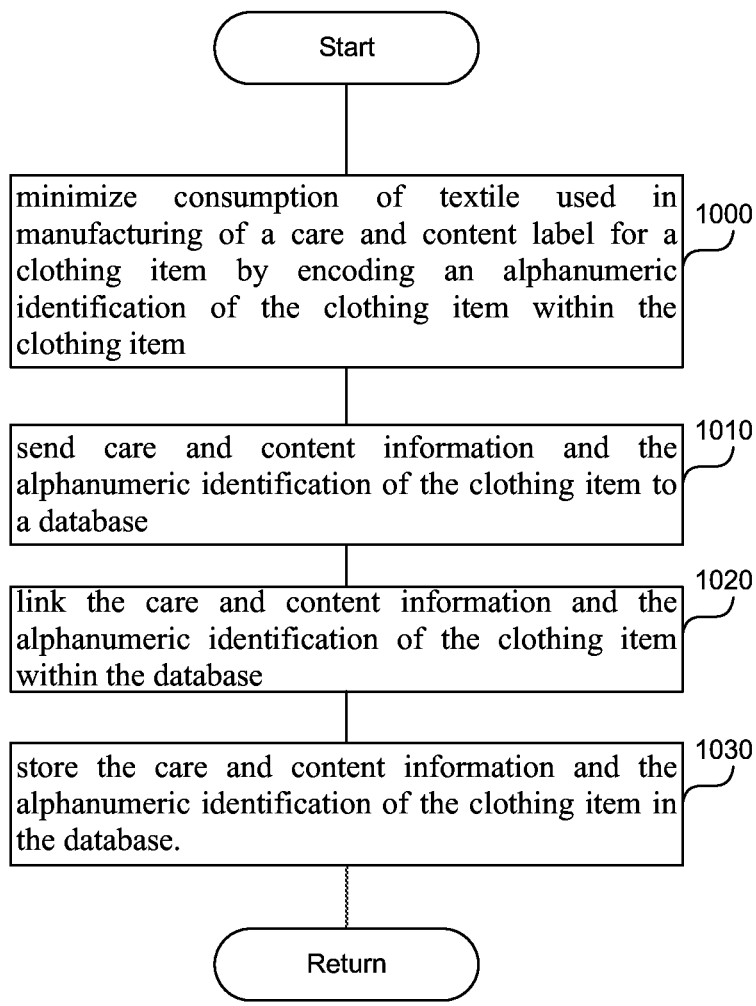
FIG. 10 is a flowchart of a method to minimize consumption of textile used in manufacturing of a clothing item label.

FIG. 10 is a flowchart of a method to minimize consumption of textile used in manufacturing of a clothing item label. In step 1000 consumption of textile used in manufacturing of a clothing item label is minimized by a manufacturing system (such as a clothing item printer) encoding a clothing item identification (ID) of the clothing item within the clothing item. Instead of using hundreds of thousands of mile of textile to create clothing item labels containing information about washing instructions, drying instructions, color, materials contained in the clothing item, etc., all the that is printed on the label can be a unique clothing item ID. The clothing item ID can be an alphanumeric string including letters numbers, special characters etc. The clothing item ID can be "DK123M!" Further, the clothing item ID can be printed in ink on the clothing item, or can be contained in the e-textile fibers of the clothing item. The clothing item ID can be encoded in at least one of a radio-frequency identification (RFID) tag, a near field communication (NFC) tag, a quick response (QR) code, a barcode, a Bluetooth transmitter, a Wi-Fi transmitter, a GPS transmitter, etc.

In addition, manufacturers of clothing item labels print the care and content label information in multiple languages because, at the time of manufacturing, manufacturers do not know where the clothing item with the affixed label is going to be sold. Using the technology disclosed here, translation is not necessary, because the translation of the care and content information is performed electronically based on the geolocation of a device reading the clothing item ID, or based on a user's language preference.

In step 1010, the manufacturing system (such as computers used in manufacturing) can send care and content information and the clothing item ID to a database. The care and content information can include a content of the clothing item, such as a material contained in the clothing item, and a percentage of the material contained in the clothing item.

In step 1020, the database can link the care and content information and the clothing item ID within the database. In step 1030, the database can store the care and content information and the clothing item ID in the database. The database can be part of the manufacturing system.

A user device of a user can send a query to the database, where the query includes the clothing item ID in the database. Upon receiving a query from the user device, the database obtains a geolocation of the user device querying the database. Based on the geolocation of the user device, the database sends a response to the query to the user device, the response translated into a language associated with the geolocation of the user device. Alternatively, the response can be translated into a language which the user indicates as the user's language preference. The user's language preference can override the language associated with the geolocation of the device.

A processor associated with the database can determine care and content information for the clothing item based on the material contained in the clothing item and the percentage of the material contained in the clothing item. For example, the processor can retrieve from the database multiple care and content information associated with multiple clothing items. When at least one care and content information among multiple care and content information is the same as the care and content information of the clothing item, (i.e., materials and material percentages are the same), the processor determines that the care information for the clothing item should be the same as the care information for the matching item. For example, when the clothing item contains 80% cotton and 20% spandex, and the matching item also contains 80% cotton and 20% spandex, the care information from the matching item are associated with the care and content information of the clothing item.

When none of multiple care and content information corresponds to the content of the clothing item, the processor can use machine learning to determine the care and content information for the clothing item. For example, a machine learning system can determine a new set of care information based on multiple care and content information associated with multiple clothing items. The care information can include washing instructions, drying instructions, ironing instructions, recommendations on which cleaning agents to use such as bleach, detergent, softener, etc. Once the machine learning determines the new set of care information, an administrator can clean the clothing item according to the new set of care information and provide feedback to the machine learning system whether the new set of care information performed well in cleaning the clothing item. Based on the feedback from the administrator, the machine learning system can positively or negatively reinforce the method used in reaching the new set of care information. For example, if the machine learning system is a neural network, and the feedback received from the administrator is positive feedback, the strength of the connections between the neurons that produced the new set of care information can be strengthened. Conversely, if the machine learning system is a neural network, and the feedback received from the administrator is negative feedback, the strength of the connections between the neurons that produced the new set of care information can be weakened.

In another embodiment, when none of multiple care and content information corresponds to the content of the clothing item, the processor can retrieve from the database multiple care and content information associated with multiple clothing items. Among multiple care and content information, the processor can find a clothing item having a content closest to the content of the clothing item. The closest content can be measured as root mean square deviation. For example, the clothing item content is 70% cotton, 15% spandex, and 15% polyester. First clothing item among multiple clothing items has content of 80% cotton, and 20% spandex, while the second clothing item among multiple clothing items has content of 70% cotton, 15% spandex and 15% nylon. The root mean square distance to the first clothing item is $Sqrt((70-80)^2+(15-20)^2+(15-0)^2)=18.7$. The root mean square distance to the second clothing item is $Sqrt((70-70)^2+(15-15)^2+(15-0)^2+(0-15)^2)=21.2$. Thus, the content of the first clothing item is closest to the content of the clothing item under consideration. The processor determines the care and content information of the clothing item under consideration to correspond to care and content information of the first clothing item. In another embodiment, instead of determining the clothing item having the content closest to the content of the clothing item under consideration, the processor can linearly interpolate between care information of various clothing items. Once the processor has determined the care information for the clothing item under consideration, the processor updates the database to include the determined care and content information for the clothing item.

The processor can also track a number of times the clothing item has been subjected to a clothing item cleaning appliance. For example the processor can track the number of times the clothing item has been washed, dried, dry-cleaned, ironed, steamed, etc. The processor can also track the operating settings of the clothing item cleaning appliance that the clothing item has been subjected to. When the number of times the clothing item has been subjected to the clothing item cleaning appliance exceeds a certain threshold, for example 50 times, the processor can offer to a user to purchase a new clothing item, identical to the clothing item. The processor can perform the purchase after a single click authorization from the user. In addition, when the clothing item has been subjected to operating settings of the clothing item cleaning appliance that are harsher than the operating settings specified in the clothing item label, the processor can also offer to the user to purchase a new clothing item identical to the clothing item, after a single click authorization from the user.

The processor can track the content of multiple clothing items upon sale. The processor can determine the content with a highest number of sales, and send a notification to a user that the determined content has the highest number of sales. The notification can be sent to manufacturers, clothes designers, or end-users.

The processor can organize multiple clothing items associated with a user into multiple bins, where each bin among multiple bins includes clothing items that have the same care and content information. The processor can send information contained in multiple bins to the user.

Figure 11:
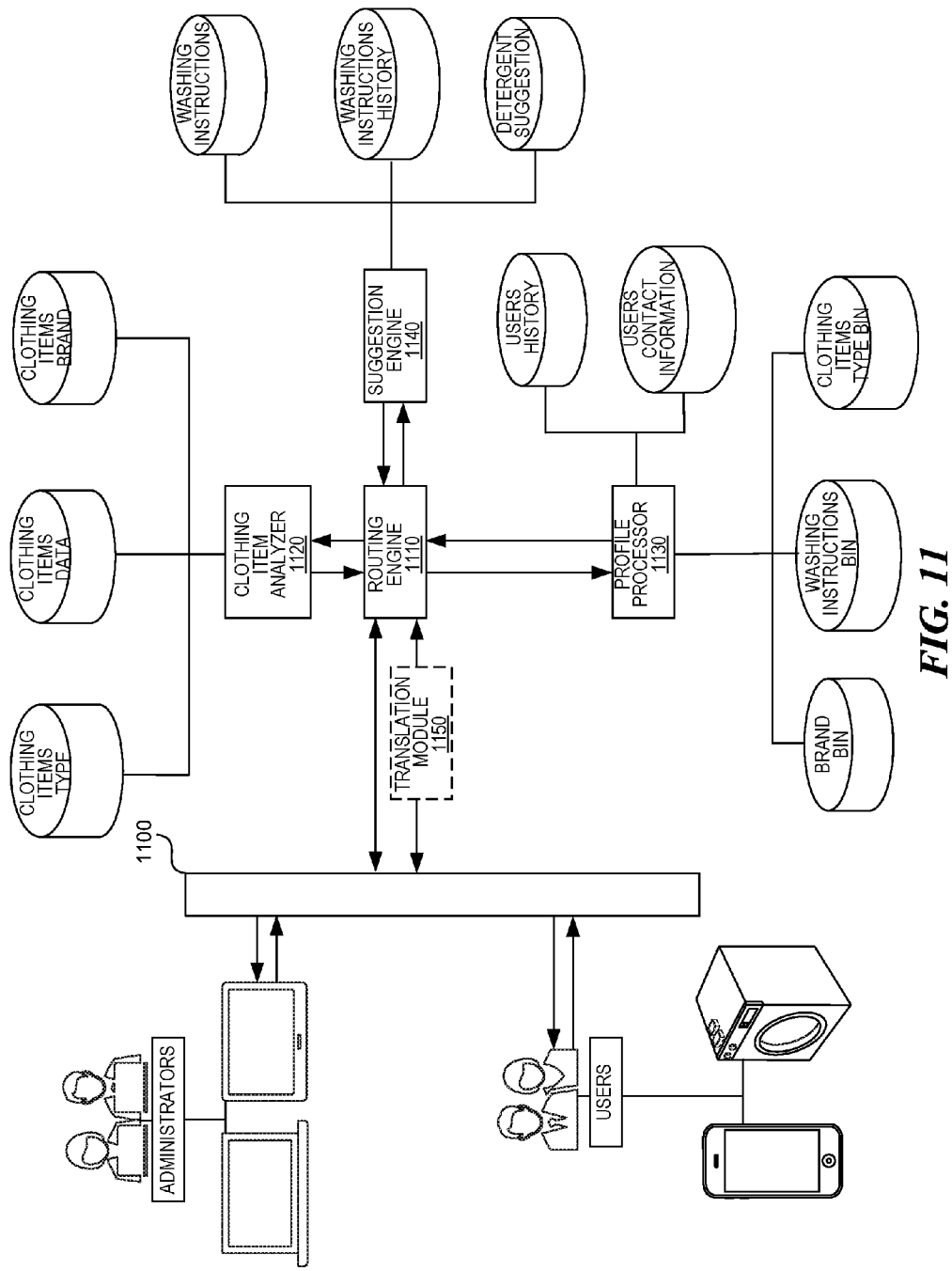
FIG. 11 is a system to encode clothing item ID within a clothing item.

FIG. 11 is a system to encode clothing item ID within a clothing item. The system includes a communication layer 1100, a routing engine 1110, a clothing item analyzer 1120, a profile processor 1130, a suggestion engine 1140, and an optional translation module 1150. The communication layer 1100 communicates with an administrator, and a user.

The routing engine 1110 can distribute a message received at the communication layer 1100 to at least one of a clothing item analyzer 1120, profile processor 1130, or a suggestion engine 1140. Further, the routing engine 1110 can send a message received from at least one of the clothing item analyzer 1120, the profile processor 1130, or the suggestion engine 1140 to the communication layer 1100.

The clothing item analyzer 1120 can organize multiple clothing item IDs into multiple categories based on care and content information associated with multiple clothing item IDs. For example, the clothing item analyzer 1120 can organize multiple clothing item IDs into groups based on clothing item type, clothing item data, clothing item brand, etc. Information regarding clothing item type, clothing item data, clothing item brand, etc. is stored in the care and content information associated with the clothing item ID. Clothing item type can be shoes, purses, backpacks, hats, jackets, pants, skirts, dresses, etc. Based on the data stored in the care and content information, the clothing item analyzer can analyze the data and create various reports, such as quantities of the clothing item produced for particular season. Clothing item data can include information, such as country of origin, clothing item manufacturer, quantity of the clothing item produced for a particular season, style number, price, clothing item name, etc. The clothing item analyzer 1120 can collect, process, and deliver the clothing item data to apparel companies, end users, logistics companies, customs, warehouses and retailers. Clothing item brand can include the apparel company or the brand name associated with the clothing item.

The profile processor 1130 organizes user information such as a user identification and clothing item IDs associated with the user. The profile processor 1130 can analyze information about users, user history, user contact information, user wardrobe, user bins and how the user organizes the washing bins, specifically, whether the washing bins are organized by garment type, by washing instructions, or by brands. The profile processor 1130 can also recommend to the user a clothing item to purchase based on a clothing item brand associated with multiple clothing item IDs, clothing item type associated with multiple clothing item IDs, and/or content information associated with multiple clothing item IDs. Further, the profile processor 1130 can track a number of times the clothing item has been subjected to the clothing item cleaning appliance, and/or the operating settings of the clothing item cleaning appliance. For example, when the number of times the clothing item has been subjected to the clothing item cleaning appliance exceeds a certain threshold (e.g., 50 times), the profile processor 1130 can offer to perform a one click replacement purchase of the identical clothing item for the user. In another example, when the operating settings of the clothing item cleaning appliance are harsher than the recommended care information of the clothing item, the profile processor 1130 can offer to perform the one click replacement purchase of the identical clothing item.

The suggestion engine 1140 analyzes care and content information of multiple clothing item IDs. Based on the analysis of care and content information, the suggestion engine 1140 can provide suggestions about updates to the care and content information. The suggestion engine 1140 can retrieve from the database multiple care and content information associated with multiple clothing items, such as washing instructions, drying instructions, content information, etc. Among multiple care and content information, the suggestion engine 1140 can find a clothing item having a content closest to the content of the clothing item. The closest content can be measured as root mean square deviation. For example, the clothing item content is 70% cotton, 15% spandex, and 15% polyester. First clothing item among multiple clothing items has content of 80% cotton, and 20% spandex, while the second clothing item among multiple clothing items has content of 70% cotton, 15% spandex and 15% nylon. The root mean square distance to the first clothing item is Sqrt(($70-80)^2+(15-20)^2+(15-0)^2$)=18.7. The root mean square distance to the second clothing item is Sqrt(($70-70)^2+(15-15)^2+(15-0)^2+(0-15)^2$)=21.2. Thus, the content of the clothing item is closest to the content of the clothing item under consideration. The suggestion engine 1140 determines the care and content information of the clothing item under consideration to correspond to care and content information of the first clothing item. In another embodiment, instead of determining the clothing item having the content closest to the content of the clothing item under consideration, the suggestion engine 1140 can linearly interpolate between care information of various clothing items. Once the suggestion engine 1140 has determined the care information for the clothing item under consideration, the suggestion engine 1140 updates the database to include the determined care and content information for the clothing item.

Further, the suggestion engine 1140 can use machine learning to update care information, or to create new care information for a clothing item when materials and material percentage contents are not in the database. In addition, the suggestion engine 1140 can make suggestions to administrators regarding the most popular materials sold in stores, as described in this application. Once the machine learning determines the new set of care information, an administrator can clean the clothing item according to the new set of care information and provide feedback to the machine learning system whether the new set of care information performed well in cleaning the clothing item. Based on the feedback from the administrator, the machine learning system can positively or negatively reinforce the method used in reaching the new set of care information. For example, if the machine learning system is a neural network, and the feedback received from the administrator is positive feedback, the strength of the connections between the neurons that produced the new set of care information can be strengthened. Conversely, if the machine learning system is a neural network, and the feedback received from the administrator is negative feedback, the strength of the connections between the neurons that produced the new set of care information can be weakened.

The translation module 1150 can receive user information including a geolocation of a user device, and/or the user's language preference. When the user's language preference is specified, the translation module 1150 can translate the message received from at least one of the clothing item analyzer 1120, the profile processor 1130, or the suggestion engine 1140 to the communication layer 1100 to a language indicated in the user's language preference. The translation module 1150 can then send the translated message to the communication layer 1100. When the user's language preference is not specified, the translation module 1150 can translate the message into a language associated with the geolocation of the user device.

Figure 12:
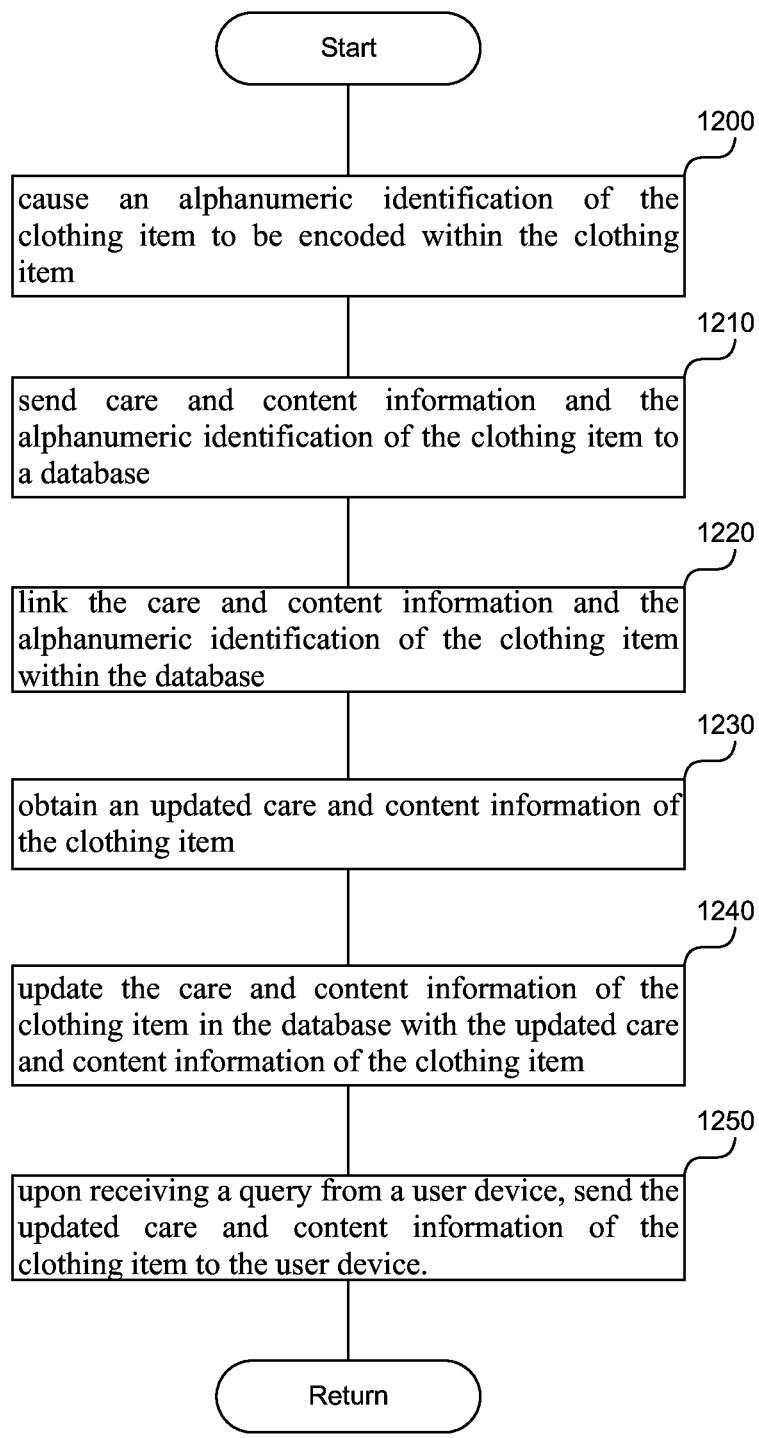
FIG. 12 is a flowchart of a method to increase accuracy of a care and content information associated with a clothing item label.

FIG. 12 is a flowchart of a method to increase accuracy of a care and content information associated with a clothing item label. In step 1200, a processor can increase the accuracy of care and content information contained in a clothing item label by causing a clothing item ID to be encoded within the clothing item. The clothing item ID can be encoded within an RFID tag, an NFC tag, a barcode, a QR code etc., as described in this application.

In step 1210, the processor can send care and content information and the clothing item ID to a database. The care and content information can include a content information of the clothing item such as a material contained in the clothing item and a percentage of the material contained in the clothing item, the care information of the clothing item such as washing instructions. In step 1220, the processor can link the care and content information and the clothing item ID within the database.

In step 1230, the processor can obtain an updated care and content information of the clothing item. For example, the processor can obtain the updated care and content information from administrator, correcting a prior error in the care and content information, or updating the care and content information based on newly available findings, such as which detergent is best for the clothing item.

In another example, the processor can obtain the updated care and content information by using machine learning to determine the care information for the clothing item based on multiple care and content information associated with multiple clothing items, as described in this application. In a third example, the processor can find a first clothing item among multiple clothing items having a content information closest to the content information of the clothing item. Closest content information can be measured using the root mean square deviation, as described in this application. The processor can determine the care information to correspond to the care information of the first clothing item. When there are multiple clothing items with the same root mean square deviation from the clothing item under consideration, and multiple clothing items have different care information, the processor can either randomly select one of multiple clothing items, or the processor can linearly interpolate between the care information of multiple clothing items.

In step 1240, the processor can update the care and content information of the clothing item in the database with the updated care and content information of the clothing item. In step 1250, the processor, upon receiving a query from a user device, can send the updated care and content information of the clothing item to the user device.

FIG. 13 shows a data structure storing clothing item information. The data structure 1300 is organized to enable efficient response to an anticipated query by defining multiple fields 1310, 1320, 1330, 1340 (only four labeled for brevity) corresponding to the anticipated query. Further, the data structure 1300 enables an efficient update because multiple fields 1310, 1320 correspond to an anticipated update. Multiple fields 1310, 1320, 1330, 1340 can include: an ID field 1310 containing the ID associated with the clothing item; a content field 1320 containing the content information of the clothing item; a care field containing the care information of the clothing item; a place of manufacture field containing information about the place of manufacture of the clothing item; a type field containing information regarding the type of garment such as shoes, purses, pants, a brand field; a size field containing information such as small, medium, large; a size chart field containing information regarding measurements associated with the small, medium, large sizes; etc.

The most likely anticipated queries regarding a clothing item are captured in the name of the field such as content, care, size, etc. Further, the most likely updates to a clothing item are to the care field. The updates can change the washing instructions, drying instructions, ironing instructions, or recommend particular cleaning agents to use, such as bleach, fabric softener, etc.

The data structure 1300 can include at least two optional fields 1330, 1340. The field 1330 indicates whether the ID of the clothing item is unique to the clothing item. The indication whether the ID of the clothing item is unique can be obtained by reading the clothing item ID encoded within the clothing item. Additionally a database can store a lookup table indicating which clothing item IDs are unique. If the clothing item ID is unique, a processor can dynamically create the field 1340 to store history of the clothing item. For example, the history can contain washing history of the clothing item, purchasing history of the clothing item, transportation history of the clothing item, distribution history of the clothing item, etc. Once the clothing item with a unique clothing item ID has been purchased, the processor stores the purchase information in the history of field 1340 of the data structure 1300. Further, once the clothing item with the unique clothing item ID has been washed, the processor stores the washing cycle information in the history field 1340 of the data structure 1300.

Any field 1310, 1320, 1330, 1340 in the data structure 1300 can include a nested data structure. In FIG. 13, the field 1320 contains a nested data structure, that is, the field 1320 itself is a data structure 1350. The data structure 1350 includes fields 1360, 1370, 1380, 1390 that specify content information of the clothing item. Field 1360 contains materials included in the clothing item, while the corresponding field 1370 includes percentages of the respective materials included in the clothing item. Field 1380 specifies the color of the clothing item, while field 1390 specifies whether there is an application on the clothing item, such as beading, sequins, etc. In another embodiment, the care field of the data structure 1300 can itself be a new data structure which contains fields corresponding to washing instructions, drying instructions, ironing instructions, preferred cleaning agents, etc.

Figure 14:
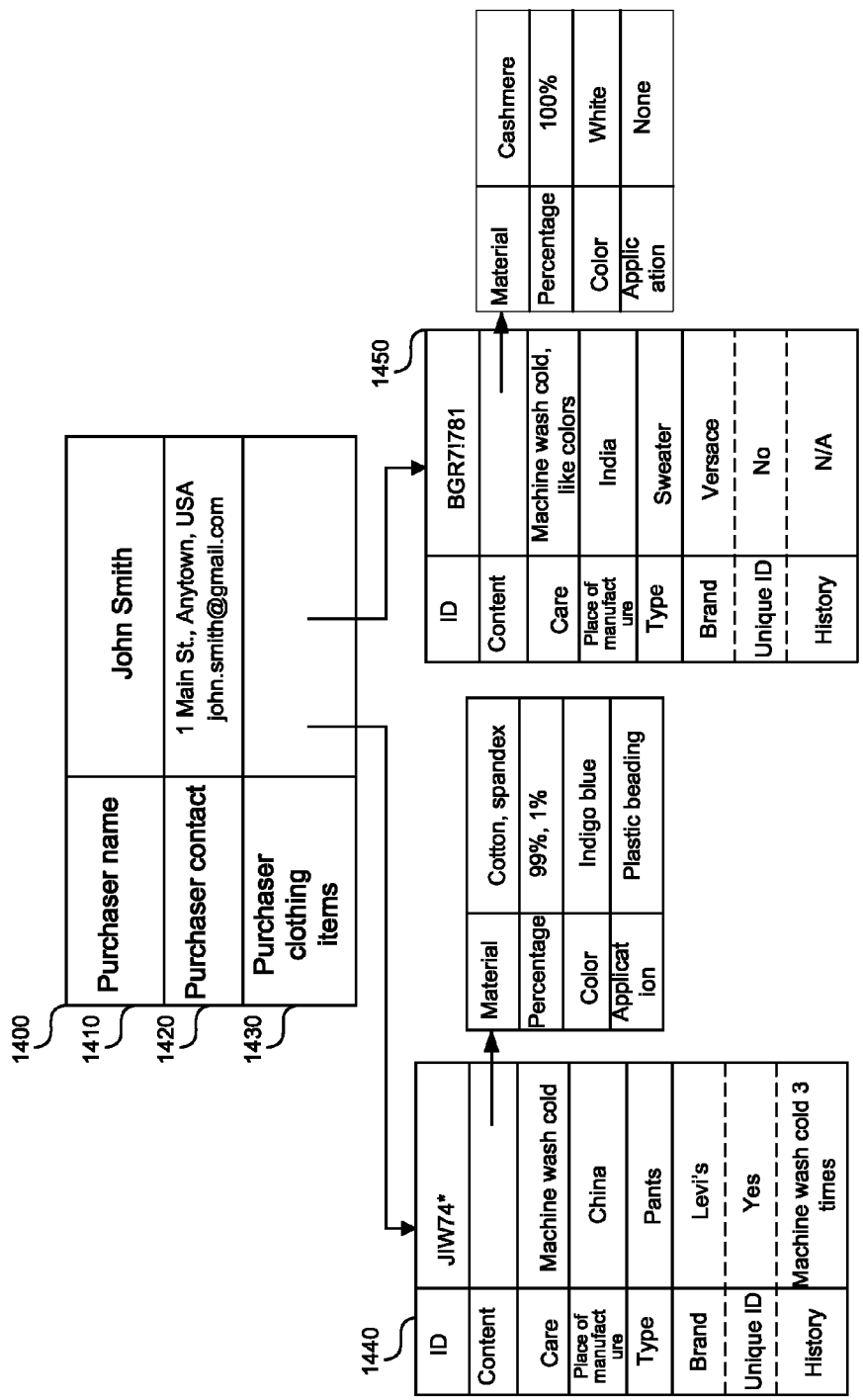
FIG. 14 shows a data structure storing user information.

FIG. 14 shows a data structure storing user information. The data structure 1400 contains fields 1410, 1420, 1430. Field 1410 specifies user's name, field 1420 contains user's contact information, while field 1430 contains a list of one or more of the user's clothing items 1440, 1450. The user's clothing items can be represented as instances of the data structure 1300 in FIG. 13.

Figure 15A:
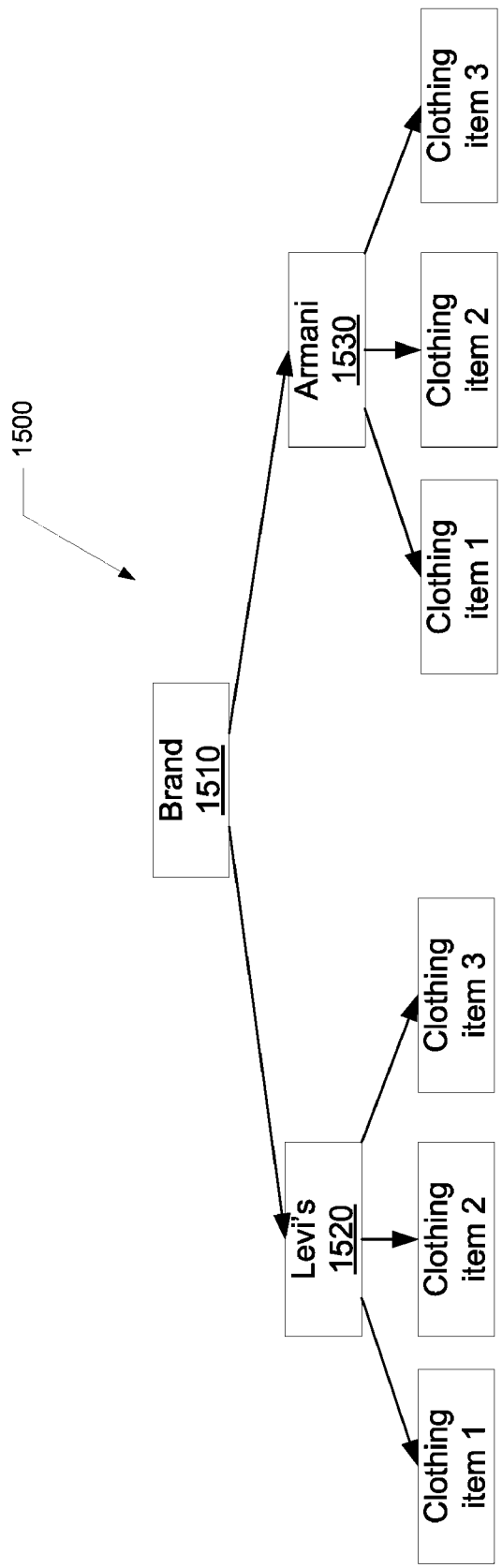
FIGS. 15A-15B show various meta-data structures.
Figure 15B:
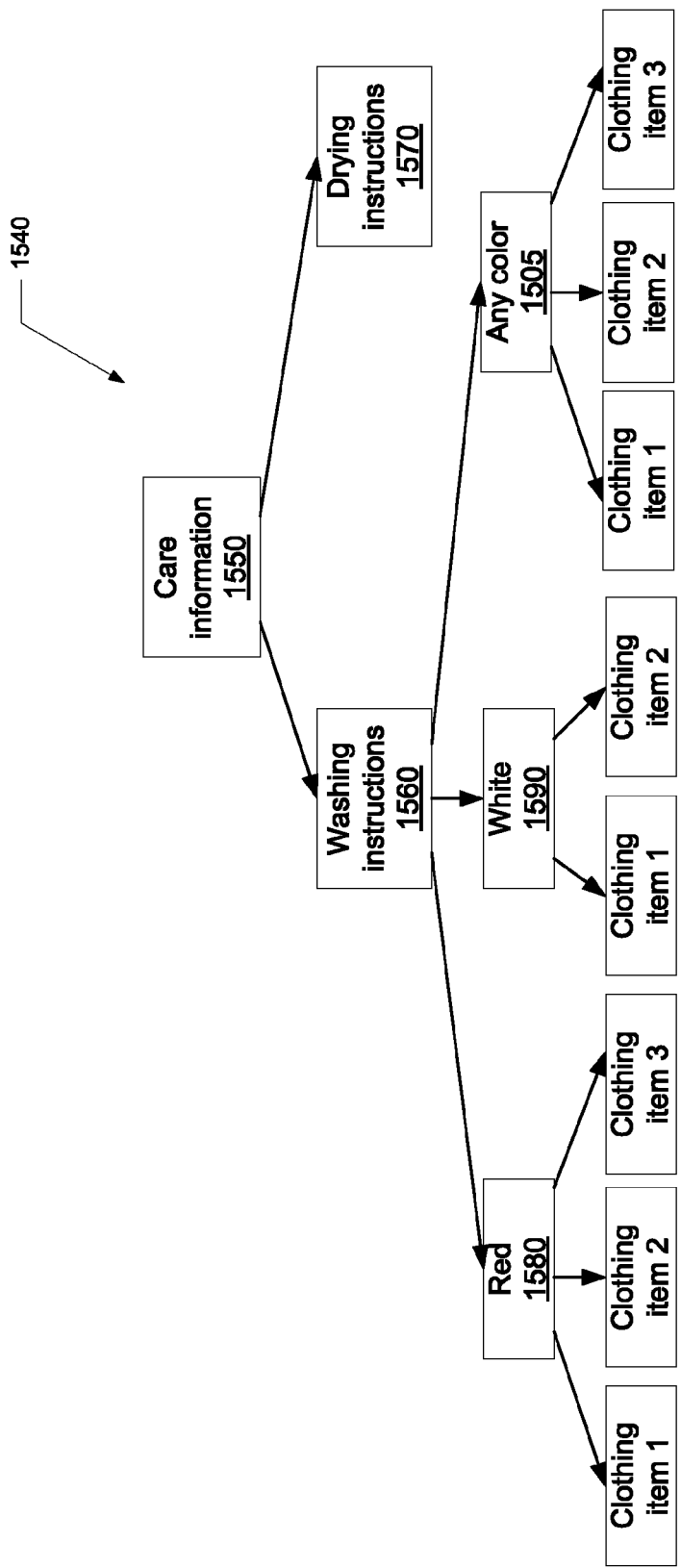

FIGS. 15A-15B show various meta-data structures. The meta-data structure 1500, 1540, are grouped according to the anticipated query to enable efficient response to the query. The meta-data structure 1500 in FIG. 15A is three levels deep. The first level 1510 can contain the field of the data structure 1300 in FIG. 13, such as the brand. The second level 1520, 1530 can contain various brands that the user owns, such as Levi's, Versace, etc. The third level contains clothing items associated with each of the brands 1520, 1530.

The meta-data structure 1540 in FIG. 15B is four levels deep. The first level 1550 can contain the field of the data structure 1300 and FIG. 13, such as care information. The second level 1560, 1570 can contain various subcategories of care information 1550, such as washing instructions 1560 and drying instructions 1570. The third level can contain various subcategories of washing instructions 1560 and drying instructions 1570. For example, washing instructions 1560 can be subdivided into categories 1580, 1590, 1505 according clothing item color. Category 1580 corresponds to clothing items having a color similar to red, category 1590 corresponds to clothing items having a color similar to white, category 1505 corresponds to clothing items that can be washed with any color. The fourth level contains clothing items associated with each of the clothing item colors 1580, 1590, 1505.

Washing instructions categories 1580, 1590, and 1505 can be displayed to the user as bins containing items that should be washed together. Drying instructions category 1570 can also be displayed as a bin to the user containing items that should be dried together.

Figure 16:
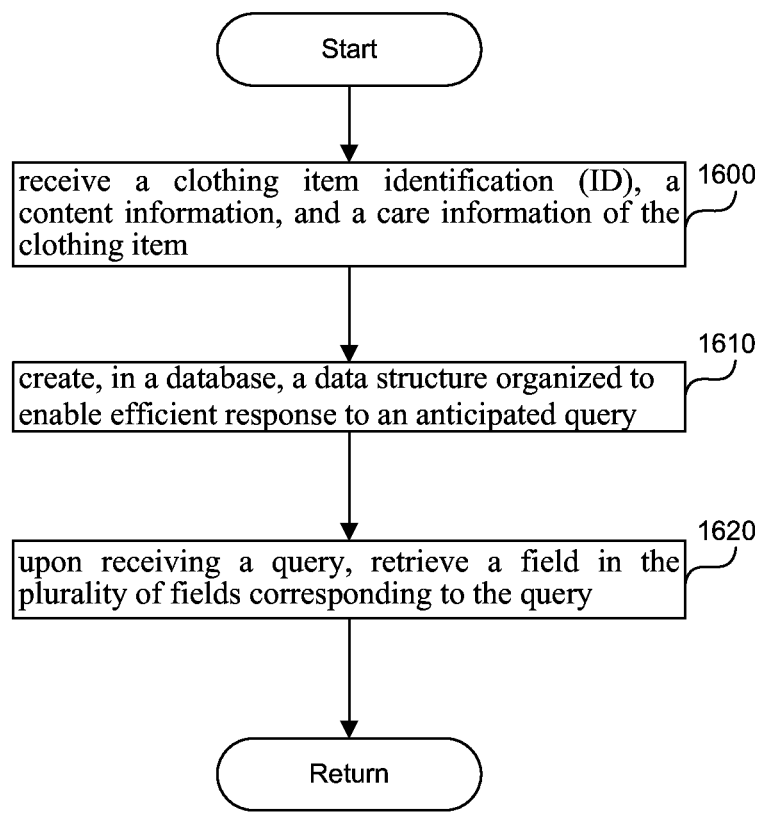
FIG. 16 is a flowchart of a method to efficiently respond to a query regarding a clothing item.

FIG. 16 is a flowchart of a method to efficiently respond to a query regarding a clothing item. In step 1600 a processor receives a clothing item identification (ID) of the clothing item, a content information of the clothing item, and a care information of the clothing item. Along with the clothing item ID, the processor can also receive an indication the clothing item ID is unique to the particular instance of the clothing item. By causing a clothing item identification (ID) to be encoded within the clothing item the consumption of textile used in manufacturing of a clothing item label is minimized.

In step 1610, the processor creates, in a database, a data structure organized to enable efficient response to an anticipated query by defining multiple fields in the data structure corresponding to the anticipated query. Multiple fields include an ID field containing the ID associated with the clothing item, a content field containing the content information of the clothing item, a care field containing the care information of the clothing item, a place of manufacture field containing the place for the garment is manufactured, size field containing the size of the garment, a type field containing the type of the garment, brand field containing the brand of the garment, the size chart field containing human measurements corresponding to various sizes, etc. One or more of the fields in the data structure can contain a second data structure, which also includes multiple fields corresponding to the anticipated query. An example of the second data structure is content data structure 1350 in FIG. 13.

When the clothing item ID, received in step 1600, is unique, the processor can dynamically create a field in a data structure to store history associated with the clothing item ID. For example, the history can contain wash history of the clothing item, purchasing history of the clothing item, transportation history the clothing item, distribution history of the clothing item, etc.

In step 1620, the processor, upon receiving a query, extracts a response to the query from the data structure in the database by retrieving a field among multiple fields corresponding to the query.

The processor can also group the data structure into a meta-data structure according to the anticipated query to enable efficient response to the query. Examples of the meta-data structures are shown in FIGS. 15A-15B.

The processor can also receive information uniquely associated with a user of the clothing item, and associate the user information and the clothing item ID in the database. Once the user information and the clothing item ID are associated, the processor can offer various incentives to the user of the clothing item.

In one embodiment, once the user information and the clothing item ID are associated, the processor can identify a frequently recurring field in the data structure associated with the clothing item ID and the user, and offer a discount to the user for clothing items having properties substantially similar to the frequently recurring field in the data structure. For example, the processor can identify that in the wardrobe of user John Smith a frequently recurring feature is a white Cashmere sweater. The processor can then offer a discount on white Cashmere sweater on sale, a discount on Cashmere sweaters, or a discount on sweaters.

In another embodiment, once the user information and the clothing item ID are associated, if the clothing item ID is unique to the particular instance of the clothing item, the processor can track a number of times the clothing item has been subjected to a clothing item cleaning appliance, and offer to the user to purchase a new clothing item based on the number of times clothing item has been subjected to the clothing item cleaning appliance. For example, if the clothing item has been washed more than 50 times, the processor can offer to the user to purchase with a single click the identical clothing item, with a different clothing item ID.

In a third embodiment, once the user information and the clothing item ID are associated, the processor can group multiple data structures associated with the user into multiple bins, wherein each bin includes clothing items that have the same care information. Subsequently, the processor can send information contained in multiple bins to the user.

The processor can also receive a query from a device, where the query includes the clothing item ID contained in the database. Upon receiving the query from the user device, the processor can obtain a geolocation of the device querying the database. Based on the geolocation of the user device, the processor can send a response to the query to the device, where the response is translated into a language associated with the geolocation of the user device.

Given a new clothing item, the processor can determine the care information for the clothing item based on the content information of the clothing item. The content information of the clothing item can include material contained in the clothing item and the percentage of the material contained in the clothing item.

To determine care information for the new clothing item, in one embodiment, the processor can retrieve from the database multiple data structures associated with multiple clothing items, and use machine learning to determine the care information for the clothing item based on the care information of multiple clothing items. Once the machine learning determines the new set of care information, an administrator can clean the clothing item according to the new set of care information and provide feedback to the machine learning system whether the new set of care information performed well in cleaning the clothing item. Based on the feedback from the administrator, the machine learning system can positively or negatively reinforce the method used in reaching the new set of care information. For example, if the machine learning system is a neural network, and the feedback received from the administrator is positive feedback, the strength of the connections between the neurons that produced the new set of care information can be strengthened. Conversely, if the machine learning system is a neural network, and the feedback received from the administrator is negative feedback, the strength of the connections between the neurons that produced the new set of care information can be weakened.

To determine care information for the new clothing item, and another embodiment, the processor can retrieve from the database multiple data structures associated with multiple clothing items, the processor can find a first clothing item among multiple clothing items having the content information closest to the content information of the clothing item than any other clothing item among multiple clothing items. The closest content can be measured as described in this application. Finally, the processor can assign the care information of the clothing item to correspond to a care information of the first clothing item.

The processor can track multiple content information associated with multiple clothing items when multiple clothing items have been sold. The processor can determine a content information among multiple content information with a highest number of sales. The processor can send a notification to the user that the determined content information has the highest number of sales.

Figure 17:
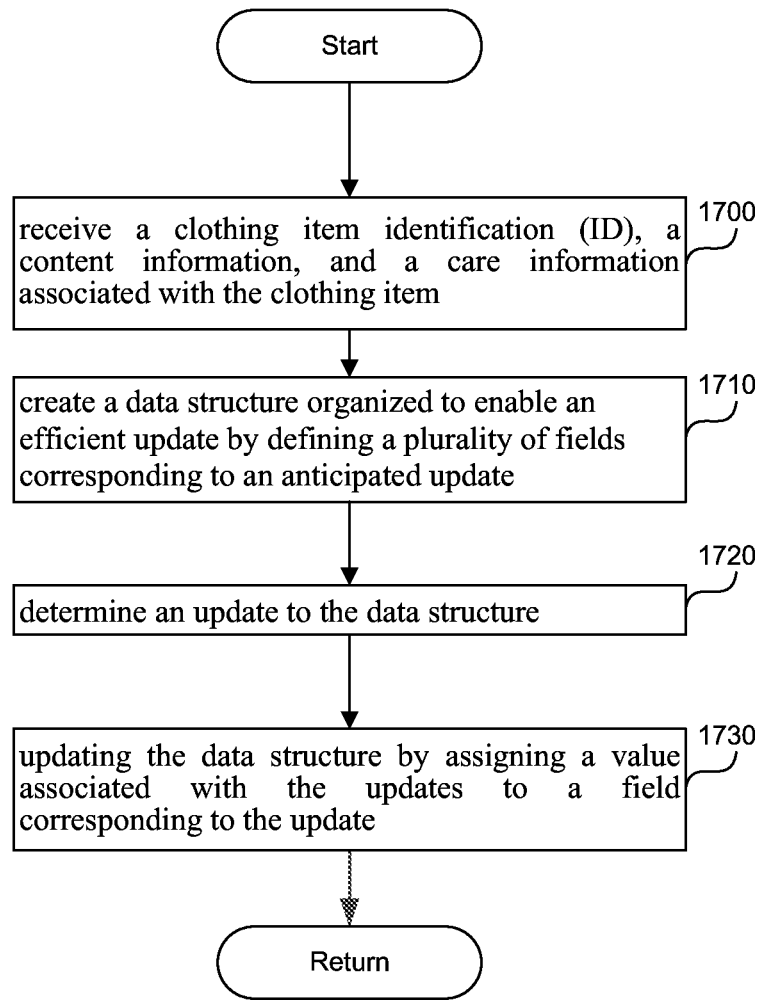
FIG. 17 is a flowchart of a method to enable efficient updates to care and content information of a clothing item.

FIG. 17 is a flowchart of a method to enable efficient updates to care and content information of a clothing item. In step 1700, a processor receives a clothing item identification (ID) associated with a clothing item, a content information of the clothing item, and a care information associated with the clothing item.

In step 1710, the processor creates in a database a data structure organized to enable an efficient update by defining multiple fields in the data structure corresponding to an anticipated update. Multiple fields include an ID field containing the clothing item ID, a content field containing the content information of the clothing item, a care field containing the care information of the clothing item, a place of manufacture field containing the place for the garment is manufactured, size field containing the size of the garment, a type field containing the type of the garment, brand field containing the brand of the garment, the size chart field containing human measurements corresponding to various sizes, etc. One or more fields can contain a second data structure as described in this application.

In step 1720, the processor determines an update to the data structure. In one embodiment, to determine the updates to the data structure, the processor retrieves from the database multiple content information of multiple clothing items and multiple care information of multiple clothing items. The processor uses machine learning to determine the care information of the clothing item based on multiple care information associated with multiple clothing items, as described in this application.

In another embodiment, to determine the updates to the data structure, the processor retrieves from the database multiple content information of multiple clothing items and multiple care information of multiple clothing items. The processor finds a first clothing item among multiple clothing items having a content information closest to the content information of the clothing item, as described in this application. Finally, the processor assigns the care information of the clothing item to correspond to the care information of the first clothing item.

In step 1730, the processor updates the data structure by assigning a value associated with the update to a field among multiple fields in the data structure corresponding to the update.

Figure 18:
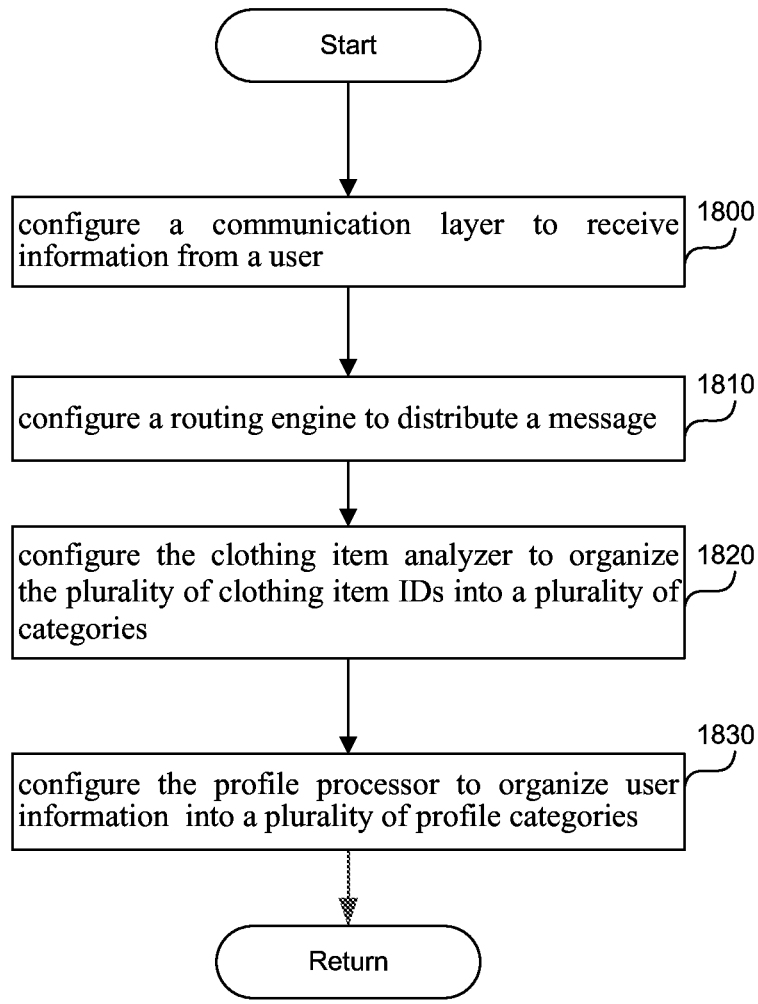
FIG. 18 is a flowchart of a method to create a system to efficiently respond to an anticipated query.

FIG. 18 is a flowchart of a method to create a system to efficiently respond to an anticipated query. In step 1800 the communication layer 1100 in FIG. 11 is configured to receive information from a user. The information includes multiple clothing item identifications (IDs) associated with multiple clothing items, multiple content information associated with multiple clothing item IDs, and multiple care information associated with multiple clothing item IDs. The communication layer 1100 can receive an indication that the clothing item ID is unique to the clothing item.

In step 1810, the routing engine 1110 in FIG. 11 is configured to distribute a message, including the information received from the user, between the communication layer 1100 and at least one of the clothing item analyzer 1120 in FIG. 11, the profile processor 1130 in FIG. 11, or the suggestion engine 1140 in FIG. 11.

In step 1820, the clothing item analyzer 1120 is configured to organize multiple clothing item IDs into multiple categories based on multiple content information and multiple care information associated with multiple clothing item IDs. Multiple categories are organized to enable efficient response to a first anticipated query including a clothing item ID, a clothing item type, or a clothing item brand. For example, the multiple categories can correspond to multiple data structures such as data structures shown in FIGS. 13, 14, 15A, 15B. In a more specific example, the clothing item analyzer 1120 can create a clothing item type category and organize it as shown in FIG. 15A, where the root node 1510 corresponds to clothing item type, instead of clothing item brand. Clothing item type can be pants, a shirt, a sweater, etc. In another specific example, the clothing item analyzer 1120 can create a brand and organize it is shown in FIG. 15A. In a third specific example, the clothing item analyzer 1120 can create clothing item ID category and organize it as shown in the data structure 1300 and FIG. 13. Further, when the clothing item ID is unique to the clothing item the clothing item analyzer 1120 can store history associated with the clothing item ID, such as wash history, distribution history purchasing history, etc. into the appropriate data structure.

In step 1830, the profile processor 1130 in FIG. 11 is configured to organize user information including a user identification and multiple clothing item IDs associated with the user into multiple profile categories. Multiple profile categories are organized to enable efficient response to a second anticipated query, which includes the user identification, a care information, and multiple clothing item IDs associated with the user. For example, the multiple profile categories can correspond to the data structure 1400 in FIG. 14 and data structure 1540 in FIG. 15B. The data structure 1400 includes user identification 1410, 1420, and multiple clothing item IDs 1440, 1450 associated with the user. The category containing the care information can correspond to the meta-data structure 1540 in FIG. 15B. The root node 1550 of care information meta-data structure contains various care instructions such as washing instructions 1560, drying instructions 1570, ironing instructions (not shown), etc. The washing instructions 1560 can be further subdivided according to color of the multiple clothing item IDs. Each node 1560, 1570 can be further subdivided, until the leaf nodes clothing item 1, clothing item 2, clothing item 3 contain the clothing item data structure 1300 in FIG. 13. The profile processor 1130 can create the data structures described above.

To create the data structure 1400 in FIG. 14, the profile processor 1130 in FIG. 11 can receive information uniquely associated with the user of the clothing item, such as purchaser name 1410 and purchaser contact 1420, and associate the information uniquely associated with the user to the clothing item ID 1440, 1450 to obtain the data structure 1400. Further, when the clothing item ID is unique to the clothing item the profile processor 1130 can store history associated with the clothing item ID, such as wash history, distribution history purchasing history, etc. into the appropriate data structure.

The suggestion engine 1140 in FIG. 11 can be configured to analyze multiple care information and multiple content information. Based on the analysis of care and content information, the suggestion engine 1140 provides suggestions about updates to multiple care information. The suggestion engine 1140 can be configured to determine the care information for a clothing item based on a content information of the clothing item. The content information of the clothing item includes material contained in the clothing item and a percentage of the material contained in the clothing item.

In one example, to determine the care information for the clothing item, the suggestion engine 1140 can be configured to retrieve multiple content information and multiple care information associated with multiple clothing items, and use machine learning to determine the care information for the clothing item based on multiple content information and multiple care information associated with multiple clothing items. Once the machine learning determines the new set of care information, an administrator can clean the clothing item according to the new set of care information and provide feedback to the machine learning system whether the new set of care information performed well in cleaning the clothing item. Based on the feedback from the administrator, the machine learning system can positively or negatively reinforce the method used in reaching the new set of care information. For example, if the machine learning system is a neural network, and the feedback received from the administrator is positive feedback, the strength of the connections between the neurons that produced the new set of care information can be strengthened. Conversely, if the machine learning system is a neural network, and the feedback received from the administrator is negative feedback, the strength of the connections between the neurons that produced the new set of care information can be weakened.

In another example, to determine the care information for the clothing item, the suggestion engine 1140 can be configured to retrieve multiple care information and multiple content information associated with multiple clothing items. The suggestion engine 1140 can find a first clothing item among multiple clothing items having the content information closest to the content information of the clothing item than any other clothing item among multiple clothing items, as described in this application. The suggestion engine 1140 can assign the care information of the clothing item to correspond to a care information of the first clothing item.

Further, the suggestion engine 1140 can track multiple content information associated with multiple clothing items when multiple clothing items have been sold. The suggestion engine 1140 can determine a content information among multiple content information with a highest number of sales, and send a notification to the user that the determined content information has the highest number of sales.

The profile processor 1130, the suggestion engine 1140, and/or the clothing item analyzer 1120 in FIG. 11 can identify a frequently recurring field in the data structure associated with the clothing item ID and the user, and offer a discount to the user for clothing items having properties substantially similar to the frequently recurring field in the data structure. For example, the profile processor 1130, the suggestion engine 1140, and/or the clothing item analyzer 1120 can identify that the user's wardrobe contains a lot of jeans, and offer to the user discount for purchasing jeans in the future.

The profile processor 1130, the suggestion engine 1140, and/or the clothing item analyzer 1120 in FIG. 11 can track a number of times the clothing item has been subjected to a clothing item cleaning appliance, and offer to the user to purchase a new clothing item based on the number of times clothing item has been subjected to the clothing item cleaning appliance. For example, once the profile processor 1130, the suggestion engine 1140, and/or the clothing item analyzer 1120 determine that the clothing item has been washed 50 times, the profile processor 1130, the suggestion engine 1140, and/or the clothing item analyzer 1120 can offer to the user to purchase a replacement clothing item with a one click purchase.

The profile processor 1130 in FIG. 11 can group multiple clothing item IDs associated with the user into multiple bins. Each bin among multiple bins includes clothing items that have the same care information. The profile processor 1130 can send the information contained in multiple bins to the user.

A translation module 1150 in FIG. 11 can be configured to obtain a geolocation of a device sending a query to the communication layer. Based on the geolocation of the device, the translation module 1150 can send a response to the query to the device, the response translated into a language associated with the geolocation of the device.

Figure 19:
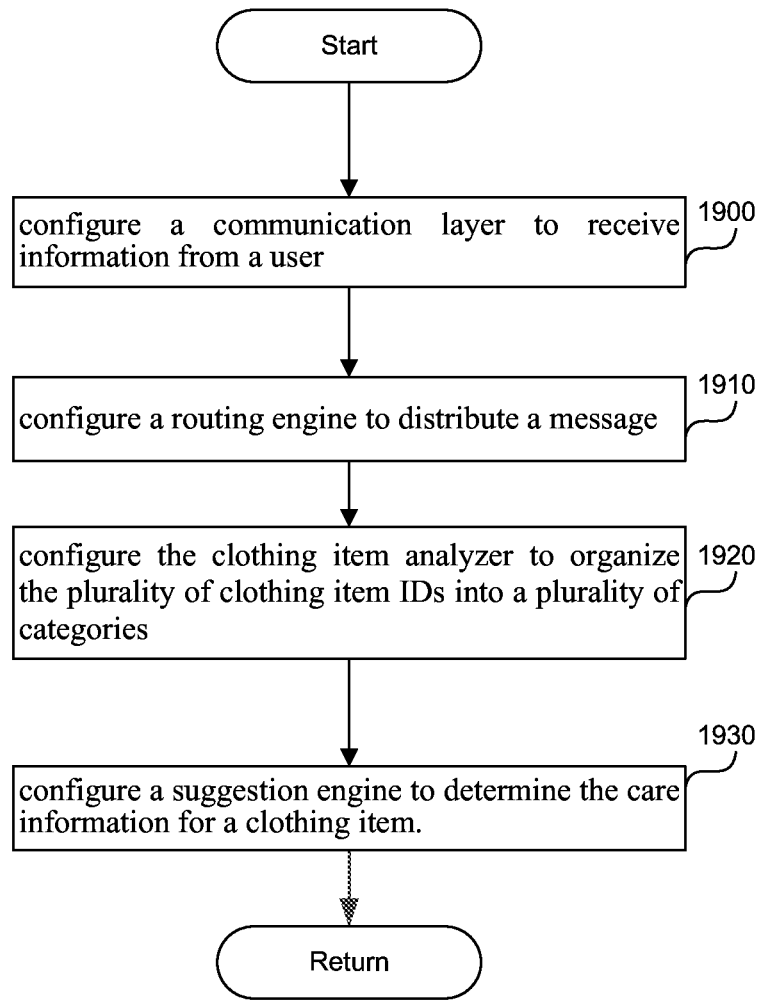
FIG. 19 is a flowchart of a method to create a system to efficiently update care and content information of a clothing item.

FIG. 19 is a flowchart of a method to create a system to efficiently update care and content information of a clothing item. In step 1900 the communication layer 1100 in FIG. 11 is configured to receive information from a user, which includes multiple clothing item identifications (IDs) associated with multiple clothing items, multiple content information associated with multiple clothing item IDs, and multiple care information associated with multiple clothing item IDs.

In step 1910 the routing engine 1110 in FIG. 11 is configured to distribute a message, including the information received from the user, between the communication layer and at least one of the clothing item analyzer 1120 in FIG. 11, the suggestion engine 1140 in FIG. 11, or the profile processor 1130 in FIG. 11.

In step 1920 the clothing item analyzer 1120 is configured to organize multiple clothing item IDs into multiple categories based on multiple content information and multiple care information associated with multiple clothing item IDs. Multiple categories include a data structure organized to enable an efficient update by defining multiple fields in the data structure corresponding to an anticipated update. Multiple fields can include an ID field containing a clothing item ID, and a care field containing a care information for the clothing item. For example, the multiple categories can correspond to multiple data structures such as data structures shown in FIGS. 13, 14, 15A, 15B. In a more specific example, the clothing item analyzer 1120 can create clothing item ID category and organize it as shown in the data structure 1300 in FIG. 13.

In step 1930, the suggestion engine 1140 is configured to determine the care information for a clothing item based on the content information of the clothing item, multiple content information associated with multiple clothing items and multiple care information associated with multiple clothing items. The content information of the clothing item includes material contained in the clothing item and a percentage of the material contained in the clothing item.

The suggestion engine 1140 can determine the care information by retrieving multiple content information of multiple clothing items and multiple care information of multiple clothing items, and by using machine learning to determine the care information of the clothing item based on multiple care information associated with multiple clothing items, as described in this application.

The suggestion engine 1140 can determine the care information by retrieving multiple content information of multiple clothing items and multiple care information of multiple clothing items. Next, the suggestion engine 1140 can find a first clothing item among multiple clothing items having a content information closest to the content information of the clothing item, as described in this application. Finally, the suggestion engine 1140 can assign the care information of the clothing item to correspond to the care information of the first clothing item.

Once the suggestion engine 1140 determines the care information of the clothing item, the clothing item analyzer 1120, the profile processor 1130, and the suggestion engine 1140 can update their respective data structures by assigning the new care information to the corresponding care fields.

Computer

Figure 20:
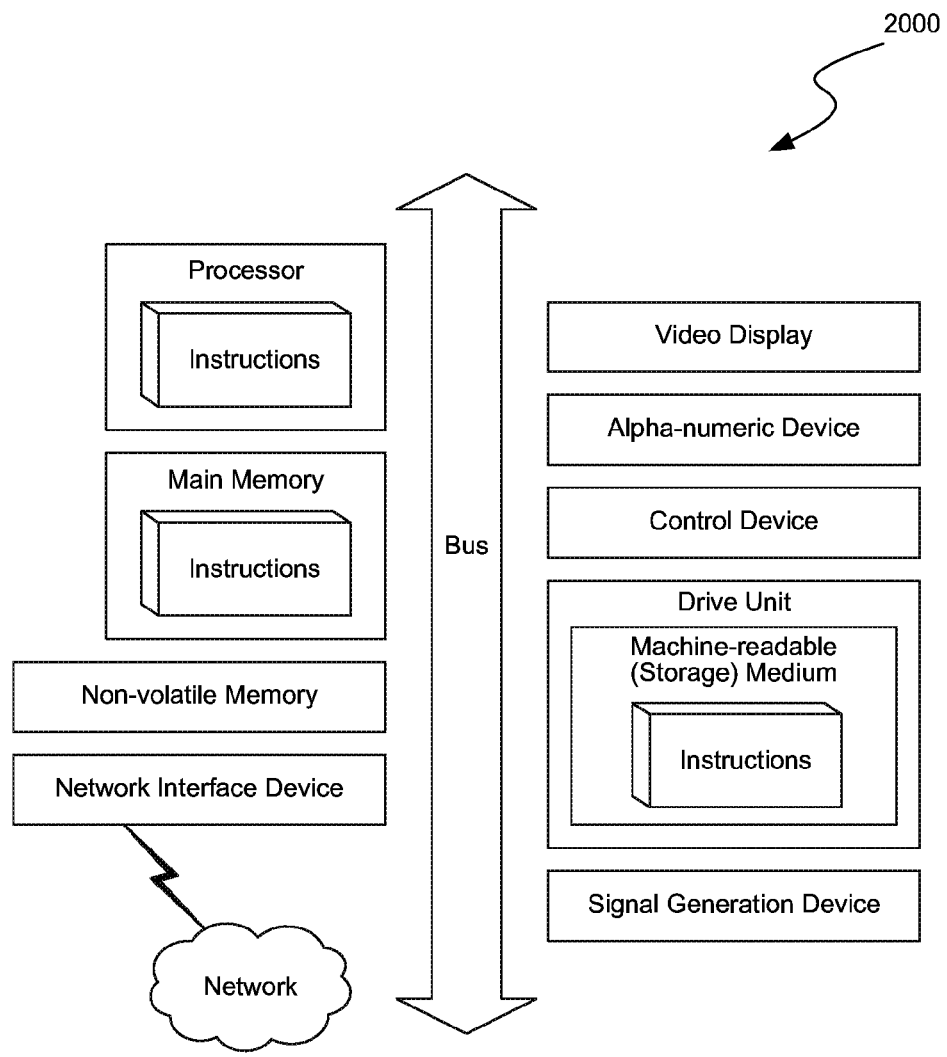
FIG. 20 is a diagrammatic representation of a machine in the example form of a computer system within which a set of instructions, for causing the machine to perform any one or more of the methodologies or modules discussed herein, may be executed.

FIG. 20 is a diagrammatic representation of a machine in the example form of a computer system 2000 within which a set of instructions, for causing the machine to perform any one or more of the methodologies or modules discussed herein, may be executed.

The computer system 2000 can be a part of the clothing item cleaning appliance, a device separate from the clothing item cleaning appliance, such as a cell phone, and/or the system in FIG. 11.

When the computer system 2000 is part of the clothing item cleaning appliance, a processor of the computer system 2000 can receive the clothing item ID, and retrieve from a database care and content information associated with the clothing item ID. The display of the computer system 2000 can display an error code, when clothing items with disparate care and content information are placed within the clothing item cleaning appliance.

When the computer system 2000 is part of the device separate from the clothing item cleaning appliance, the processor of the computer system 2000 can receive the clothing item ID, communicate with a database storing the care and content information, and operate the clothing item cleaning appliance. The display of the computer system 2000 can communicate with a user by, for example, displaying a user's wardrobe arranged in clothing bins according to care information.

When the computer system 2000 is part of the system shown in FIG. 11, the computer system 2000 can contain one or more processors implementing the communication layer 1100, the routing engine 1110, the clothing item analyzer 1120, the profile processor 1130, the suggestion engine 1140, and the translation module 1150, in software and/or in hardware.

The various databases disclosing this application can exist in the main memory, in the nonvolatile memory, or in the machine-readable storage medium of the computer system 2000. The communication between various elements disclosed in this application can be performed via the network of the computer system 2000.

In the example of FIG. 20, the computer system 2000 includes a processor, memory, non-volatile memory, and an interface device. Various common components (e.g., cache memory) are omitted for illustrative simplicity. The computer system 2000 is intended to illustrate a hardware device on which any of the components described in the example of FIGS. 1-19 (and any other components described in this specification) can be implemented. The computer system 2000 can be of any applicable known or convenient type. The components of the computer system 2000 can be coupled together via a bus or through some other known or convenient device.

This disclosure contemplates the computer system 2000 taking any suitable physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 2000 may include one or more computer systems 2000; be unitary or distributed; span multiple geolocations; span multiple machines; or reside in a cloud, which may include one or more cloud components in one or more networks. Where appropriate, one or more computer systems 2000 may perform without substantial spatial or temporal limitation one or more steps of one or more methods described or illustrated herein. As an example and not by way of limitation, one or more computer systems 2000 may perform in real time or in batch mode one or more steps of one or more methods described or illustrated herein. One or more computer systems 2000 may perform at different times or at different geolocations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 2000. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable geolocation appropriate for processing, and for illustrative purposes, that geolocation is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient geolocation (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 2000. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 20 reside in the interface.

In operation, the computer system 2000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method of operating a washing machine with the aid of a processor, comprising:
   providing the processor with a database comprising at least a garment identification (ID), and care and content information for a garment;
   determining, by the processor, information encoded in the garment, the information comprising the garment identification (ID) stored within a radio-frequency identification (RFID) tag within the garment;
   retrieving, by the processor, from the database care and content information of the garment associated with the garment ID, the care and content information comprising washing instructions for the garment;
   receiving, by the processor, from the database an update to the care and content information of the garment and reducing consumption of non-sustainable materials contained in a clothing label by avoiding re-creation of the clothing label;
   automatically grouping the garment with a plurality of garments having the same washing instructions; and
   operating, by the processor, the washing machine in accordance with the care and content information for the garment.

2. A method comprising:
   obtaining, by a processor, information encoded in a clothing item, the information comprising a clothing item identification (ID);
   retrieving, by the processor, from a database care and content information of the clothing item, the care and content information associated with the clothing item ID in the database;
   receiving, by the processor, from the database an update to the care and content information of the clothing item and reducing consumption of non-sustainable materials contained in a clothing label by avoiding re-creation of the clothing label;
   automatically grouping the clothing item with a plurality of clothing items having care and content information corresponding to the care and content information of the clothing item; and operating, by the processor, a clothing item cleaning appliance in accordance with the care and content information associated with the clothing item ID.

3. The method of claim 2, the care and content information comprising washing instructions associated with the clothing item.

4. The method of claim 2, the clothing item cleaning appliance comprising a washing machine, a drying machine, a dry-cleaning appliance, or an ironing appliance.

5. The method of claim 2, wherein the processor is mounted within the clothing item cleaning appliance.

6. The method of claim 2, wherein the processor is mounted within a device separate from the clothing item cleaning appliance.

7. The method of claim 6, said operating, by the processor, the clothing item cleaning appliance comprising:
   sending, by the processor, the care and content information of the clothing item to the clothing item cleaning appliance.

8. The method of claim 2, the information encoded in the clothing item encoded in at least one of a radio-frequency identification (RFID) tag, a near field communication (NFC) tag, a quick response (QR) code, a barcode, a short wavelength radio wave transmitter, a wireless frequency (Wi-Fi) transmitter, or a global positioning system (GPS) transmitter.

9. The method of claim 2, the information encoded in the clothing item encoded in a digital component embedded in a fabric of the clothing item.

10. The method of claim 2, said automatically grouping comprising:
    detecting, by the processor, that a plurality of clothing items placed inside the clothing item cleaning appliance have disparate care and content information; and
    sending, by the processor, a notification comprising an indication that the plurality of clothing items placed inside the clothing item cleaning appliance have disparate care and content information.

11. The method of claim 2, said automatically grouping comprising:
    organizing, by the processor, a plurality of clothing items associated with a user into a plurality of bins, wherein each bin in the plurality of bins comprises clothing items that have the same care and content information; and
    displaying, by the processor, information contained in the plurality of bins to the user.

12. The method of claim 2, comprising:
    upon completing said operation of the clothing item cleaning appliance, sending, by the processor, to the database settings of the clothing item cleaning appliance during the operation, and clothing item ID subjected to the operation of the clothing item cleaning appliance.

13. A system comprising:
    a code reader obtaining information encoded in a clothing item, the information comprising an identification (ID) of the clothing item;
    a receiving module obtaining the ID from the code reader;
    a database communication module retrieving from a database care and content information for the clothing item, the care and content information associated with the ID in the database, and the database communication module receiving an update to the care and content information of the clothing item from the database;
    an appliance communication module:
    automatically grouping the clothing item with a plurality of clothing items having care and content information corresponding to the care and content information of the clothing item; and
    the appliance communication module operating a clothing item cleaning appliance in accordance with the care and content information of the clothing item.

14. The system of claim 13, comprising a digital component, attached to the clothing item, comprising the ID of the clothing item, the digital component coated in a waterproof and heatproof material.

15. The system of claim 13, the receiving module, the database communication module, and the appliance communication module implemented on a processor mounted within the clothing item cleaning appliance.

16. The system of claim 13, the receiving module, the database communication module, and the appliance communication module implemented on a processor mounted within a device separate from the clothing item cleaning appliance.

17. The system of claim 13, the code reader comprising an RFID tag reader, an NFC tag reader, a camera, a short wavelength radio wave receiver, Wi-Fi receiver, or a GPS receiver.

18. The system of claim 13, comprising a translation module:
    determining a user preferred language based on geolocation of a user, or a user's language preference; and
    translating information presented to the user into the user preferred language.

19. The system of claim 13, the appliance communication module:
    detecting that a plurality of clothing items placed inside the clothing item cleaning appliance have disparate care and content information; and
    sending a notification that the plurality of clothing items placed inside the clothing item cleaning appliance have disparate care and content information.

20. The system of claim 19, the appliance communication module:
    upon detecting disparate care and content information, determining a gentlest operating settings from the care and content information of the plurality of clothing items; and
    operating the clothing item cleaning appliance according to the gentlest operating settings.

21. A method comprising:
    obtaining, by a processor, information encoded in a clothing item, the information comprising a clothing item identification (ID);
    retrieving, by the processor, from a database care and content information of the clothing item, the care and content information associated with the clothing item ID in the database;
    receiving, by the processor, from the database an update to the care and content information of the clothing item thereby reducing consumption of non-sustainable materials contained in a clothing label by avoiding re-creation of the clothing label; and
    operating, by the processor, a clothing item cleaning appliance in accordance with the care and content information associated with the clothing item ID.

* * * * *